US010129857B2

(12) United States Patent
Sun et al.

(10) Patent No.: US 10,129,857 B2
(45) Date of Patent: Nov. 13, 2018

(54) BAND OCCUPANCY TECHNIQUES FOR TRANSMISSIONS IN UNLICENSED SPECTRUM

(71) Applicant: QUALCOMM Incorporated, San Diego, CA (US)

(72) Inventors: Jing Sun, San Diego, CA (US); Tao Luo, San Diego, CA (US); Ravi Teja Sukhavasi, San Diego, CA (US); Yongbin Wei, San Diego, CA (US); Durga Prasad Malladi, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 328 days.

(21) Appl. No.: 14/933,902

(22) Filed: Nov. 5, 2015

(65) Prior Publication Data
US 2016/0135172 A1 May 12, 2016

Related U.S. Application Data

(60) Provisional application No. 62/076,375, filed on Nov. 6, 2014.

(51) Int. Cl.
*H04W 72/04* (2009.01)
*H04W 74/00* (2009.01)
(Continued)

(52) U.S. Cl.
CPC ....... *H04W 72/0413* (2013.01); *H04L 5/0007* (2013.01); *H04L 43/16* (2013.01);
(Continued)

(58) Field of Classification Search
USPC .......................................... 370/329; 455/525
See application file for complete search history.

(56) References Cited

U.S. PATENT DOCUMENTS 9,774,428 B2* 9/2017 Montreuil ............. H04L 5/0041
2003/0207698 A1* 11/2003 Shpak .................. H04L 47/245
455/525

(Continued)

FOREIGN PATENT DOCUMENTS

EP         2 343 849 A2      7/2011
WO    WO-2012/139278 A1    10/2012
WO    WO-2013/010014 A1     1/2013

OTHER PUBLICATIONS

International Search Report and Written Opinion—PCT/US2015/059434—ISA/EPO—dated Jan. 27, 2016. (15 total pages).
(Continued)

*Primary Examiner* — Edan Orgad
*Assistant Examiner* — Emmanuel K Maglo
(74) *Attorney, Agent, or Firm* — Arent Fox, LLP

(57) ABSTRACT

A method and apparatus for uplink transmission by a user equipment (UE) includes receiving a first assignment for one or more beacon signals. The first assignment includes a first resource assignment and a first interlace assignment. The UE may determine that a size of a payload of an uplink transmission is less than a threshold. The UE may transmit the one or more beacon signals according to the first assignment in response to the determination. The one or more beacon signals increase bandwidth occupancy by the UE over a contention-based spectrum. Additionally, the UE may receive a second assignment for the payload of the uplink transmission. The second assignment includes a second resource assignment and a second interlace assignment. The UE may transmit the payload of the uplink transmission according to the second resource assignment on the second interlace assignment.

28 Claims, 14 Drawing Sheets

(51) Int. Cl.
*H04L 5/00* (2006.01)
*H04L 12/26* (2006.01)
*H04W 74/08* (2009.01)
*H04W 72/14* (2009.01)

(52) U.S. Cl.
CPC ...... *H04W 74/006* (2013.01); *H04W 72/0446* (2013.01); *H04W 72/14* (2013.01); *H04W 74/08* (2013.01)

(56) References Cited

U.S. PATENT DOCUMENTS

| | | | | |
|---|---|---|---|---|
| 2006/0205396 | A1* | 9/2006 | Laroia | H04L 1/0015 455/422.1 |
| 2007/0271568 | A1* | 11/2007 | Gorokhov | H04W 72/042 718/104 |
| 2008/0161033 | A1* | 7/2008 | Borran | H04W 52/16 455/522 |
| 2009/0135761 | A1* | 5/2009 | Khandekar | H04L 5/0053 370/328 |
| 2010/0098012 | A1* | 4/2010 | Bala | H04L 5/001 370/329 |
| 2010/0136998 | A1* | 6/2010 | Lott | H04W 16/14 455/453 |
| 2012/0044897 | A1* | 2/2012 | Wager | H04L 5/0037 370/329 |
| 2013/0121270 | A1* | 5/2013 | Chen | H04L 5/001 370/329 |
| 2013/0315152 | A1* | 11/2013 | Ratasuk | H04W 76/023 370/329 |
| 2013/0336113 | A1* | 12/2013 | Okuyama | H04W 28/044 370/230.1 |
| 2014/0044105 | A1* | 2/2014 | Bontu | H04L 5/001 370/336 |
| 2014/0378157 | A1* | 12/2014 | Wei | H04W 16/14 455/454 |
| 2015/0215471 | A1* | 7/2015 | Ljung | H04M 15/58 455/405 |
| 2015/0289208 | A1* | 10/2015 | Liu | H04W 52/0229 370/252 |
| 2016/0007378 | A1* | 1/2016 | Bertorelle | H04W 74/006 370/329 |
| 2016/0037490 | A1* | 2/2016 | Pazhyannur | H04W 16/14 370/329 |
| 2016/0043843 | A1* | 2/2016 | Liu | H04L 5/0048 370/329 |
| 2016/0095009 | A1* | 3/2016 | Ling | H04W 16/14 370/329 |
| 2016/0095110 | A1* | 3/2016 | Li | H04W 72/1215 370/329 |
| 2016/0135143 | A1* | 5/2016 | Won | H04W 72/005 370/312 |
| 2016/0135172 | A1* | 5/2016 | Sun | H04L 5/0007 370/329 |
| 2016/0183276 | A1* | 6/2016 | Marinier | H04W 72/02 370/329 |
| 2016/0227416 | A1* | 8/2016 | Suzuki | H04W 72/0453 |

OTHER PUBLICATIONS

Qualcomm Incorporated: "Solutions for required functionalities and design targets", 3GPP Draft; R1-144000 Solutions for Required Functionalities and Design Targets, 3rd Generation Partnership Project (3GPP), Mobile Competence Centre ; 650, Route Des Lucioles ; F-06921 Sophia-Antipoli vol. Ran WG1, No. Ljubljana, Slovenia; Oct. 6, 2014-Oct. 10, 2014 Sep. 27, 2014 (Sep. 27, 2014), XP050869665, 5 pages Retrieved from the Internet: URL:http://www.3gpp.org/ftp/tsg_ran/WG1_RL1/TSGR178b/Docs/ [retrieved on Sep. 27, 2014].

* cited by examiner

| 401 | 402 | 403 |
|---|---|---|
| 0 | 0 | 0 |
| 1 | 1 | 1 |
| 2 | 2 | 2 |
| 3 PL | 3 | 3 PL |
| 4 | 4 | 4 |
| 5 | 5 | 5 |
| 6 | 6 | 6 |
| 7 | 7 | 7 |
| 8 | 8 | 8 |
| 9 | 9 | 9 |
| 10 | 10 | 10 |
| 11 | 11 | 11 |
| 12 | 12 | 12 |
| 13 PL | 13 | 13 PL |
| 14 | 14 | 14 |
| 15 | 15 | 15 |
| 16 | 16 | 16 |
| 17 | 17 | 17 |
| 18 | 18 | 18 |
| 19 | 19 | 19 |
| 20 | 20 | 20 |
| 21 | 21 | 21 |
| 22 · | 22 · | 22 · |
| 23 PL | 23 | 23 PL |
| ⋮ | ⋮ | ⋮ |
| 90 | 90 | 90 |
| ⋮ | ⋮ | ⋮ |
| 97 | 97 | 97 |
| 98 PL | 98 | 98 PL |
| 99 | 99 | 99 |

TIME →

FIG. 6A

| 401 | 402 | 403 |
|---|---|---|
| 0 | 0  BS | 0 |
| 1 | 1 | 1 |
| 2 | 2 | 2 |
| 3 PL | 3 | 3 PL |
| 4 | 4 | 4 |
| 5 | 5 | 5 |
| 6 | 6 | 6 |
| 7 | 7 | 7 |
| 8 | 8 | 8 |
| 9 | 9 | 9 |
| 10 | 10  BS | 10 |
| 11 | 11 | 11 |
| 12 | 12 | 12 |
| 13 PL | 13 | 13 PL |
| 14 | 14 | 14 |
| 15 | 15 | 15 |
| 16 | 16 | 16 |
| 17 | 17 | 17 |
| 18 | 18 | 18 |
| 19 | 19 | 19 |
| 20 | 20 BS | 20 |
| 21 | 21 | 21 |
| 22 · | 22 · | 22 · |
| 23 PL | 23 | 23 PL |
| ⋮ | ⋮ | ⋮ |
| 90 | 90  BS | 90 |
| ⋮ | ⋮ | ⋮ |
| 97 | 97 | 97 |
| 98 PL | 98 | 98 PL |
| 99 | 99 | 99 |

TIME →

FIG. 6B

BAND OCCUPANCY TECHNIQUES FOR TRANSMISSIONS IN UNLICENSED SPECTRUM

This application claims priority to U.S. Provisional Application No. 62/076,375 filed Nov. 6, 2014, titled "BAND OCCUPANCY TECHNIQUES FOR TRANSMISSIONS IN UNLICENSED SPECTRUM," which is assigned to the assignee of the current application and hereby incorporated by reference in its entirety.

BACKGROUND

Aspects of this disclosure relate generally to telecommunications, and more particularly to band occupancy techniques for transmissions in unlicensed spectrum.

A wireless communication network may be deployed to provide various types of services (e.g., voice, data, multimedia services, etc.) to users within a coverage area of the network. In some implementations, one or more access points (e.g., corresponding to different cells) provide wireless connectivity for access terminals (e.g., cell phones) that are operating within the coverage of the access point(s). In some implementations, peer devices provide wireless connectively for communicating with one another.

Communication devices in a wireless communications network sending uplink transmissions have assigned resources on the uplink frequency band. In a wireless environment where a wireless local area network (WLAN) device, such as a Long Term Evolution (LTE) device, operates in an unlicensed radio frequency (RF) band shared with a wireless local area network (WLAN) device (e.g., a WiFi device), it may be required that any device actively transmitting on the uplink occupies at least 80% of the bandwidth of a frequency band subframe. However, in many cases, the payload size for an LTE device operating in the unlicensed RF band is very small and cannot meet this requirement. For example, an uplink control channel transmission may regularly occupy only about 1 resource block (RB) per subframe. One solution is to use lower modulation and coding scheme (MCS) and a higher coding gain to generate more coded bits to fill up more modulation symbols. The power spectral density may also be reduced (i.e., reducing transmit power per subcarrier tone), but at the risk of becoming susceptible to interference from other competing devices sharing the bandwidth. Moreover, there may be additional occupancy requirements, such as a spectrum mask requirement, which mandates that within each 1 MHz sliding window, the transmit power cannot exceed certain level.

A wireless terminal device (also referred to as user equipment or access terminal) that needs to transmit on an unlicensed RF band may also be required to perform a clear channel assessment (CCA) each time before sending an uplink transmission. For example, a device may perform CCA/eCCA to determine whether a channel is clear for transmission. Generally, the CCA procedures may involve monitoring a channel for a CCA duration or time slot, for example 20 microsecond (μs). If the time slot is clear (e.g., the communications medium is available or accessible), the device may begin using the channel. When a channel is not clear, the device may initialize a random back-off counter for the channel. Each time the device detects a clear time slot, the random back-off counter is decremented. When the random back-off counter reaches 0, the device may transmit for a limited transmission opportunity. The duration of the transmission opportunity may be a multiple of the CCA time slot duration. During the transmission opportunity, other devices would be blocked by the transmission from also transmitting using the channel. Additionally, other channels on the same device, which are not being used for a transmission, may also be blocked because of RF leakage. In cases where discontinuous uplink transmissions are requested by the terminal device, a failed CCA may cause loss of the channel, and a disruption of the uplink transmission bursts.

An LTE device transmits data in units of resource elements within resource blocks using orthogonal frequency division multiple access (OFDMA) channels for downlink transmissions, and single carrier frequency division multiple access (SC-FDMA) channels for uplink transmissions. The OFDMA and SC-FDMA channels are divided into subchannels within a frequency band and subframes in the time domain. Each subframe is further divided into OFDM symbols to provide data input for FFT and IFFT processing of the carrier frequency. There may be occasions when the LTE device needs a blank OFDM symbol, such as for example to avoid interference by other LTE device transmissions, or to avoid interference to reception of a signal. However, a blank symbol transmission may cause the LTE device to lose access to the channel.

Hence, a mechanism is needed to allow LTE devices to gain access or maintain existing access to unlicensed bandwidth for uplink transmissions while meeting occupancy constraints using unoccupied OFDM symbols, resource blocks, and subframes in the unlicensed bandwidth.

SUMMARY

Systems and methods for increasing bandwidth occupancy of transmissions from wireless devices operating in unlicensed spectrum are disclosed.

In an aspect, the disclosure provides a method for uplink transmission by a user equipment (UE). The method may include receiving a first assignment for one or more beacon signals, the first assignment including a first interlace assignment. The method may further include determining that a size of an uplink grant for a payload of an uplink transmission is less than a threshold. The method may also include transmitting the one or more beacon signals according to the first assignment in response to determining that the size of the uplink grant for the payload of the uplink transmission is less than the threshold, wherein the one or more beacon signals increase bandwidth occupancy by the UE over the contention-based spectrum.

In another aspect, the disclosure provides a UE for uplink transmission. The UE may include means for receiving a first assignment for one or more beacon signals, the first assignment including a first interlace assignment in a contention-based spectrum. The UE may further include means for determining that a size of an uplink grant for a payload of an uplink transmission is less than a threshold. The UE may also include means for transmitting the one or more beacon signals according to the first assignment in response to determining that the size of the uplink grant for the payload of the uplink transmission is less than the threshold, wherein the one or more beacon signals increase bandwidth occupancy by the UE over the contention-based spectrum.

In another aspect, the disclosure provides another UE. The UE may include a transceiver configured to receive signals indicating at least one assignment and to transmit one or more beacon signals. The UE may further include a memory, and a processor communicatively coupled to the memory and the transceiver. The memory and processor may be configured to receive, via the transceiver, a first assignment for the one or more beacon signals, the first assignment including a first interlace assignment in a contention-based spectrum. The processor and the memory may be further configured to determine that a size of an uplink grant for a payload of an uplink transmission is less than a threshold. The processor and the memory may be further configured to transmit, via the transceiver, the one or more of the beacon signals according to the first assignment in response to determining that the size of the uplink grant for the payload of the uplink transmission is less than the threshold. The one or more beacon signals may increase bandwidth occupancy by the UE over the contention-based spectrum.

In another aspect, the disclosure provides a computer readable medium storing computer executable code for uplink transmission by a UE. The computer readable medium may include code for receiving a first assignment for one or more beacon signals, the first assignment including a first resource assignment and a first interlace assignment in a contention-based spectrum. The computer readable medium may further include code for determining that a size of a payload of an uplink transmission is less than a threshold. The computer readable medium may also include code for transmitting the one or more beacon signals according to the first assignment in response to determining that the size of the payload of the uplink transmission is less than the threshold, wherein the one or more beacon signals increase bandwidth occupancy by the UE over the contention-based spectrum.

In an aspect, the disclosure provides a method for allocating resources for uplink transmission. The method may include determining a first assignment for beacon signals configured to increase bandwidth occupancy over a contention-based spectrum when a size of a payload of the uplink transmission is less than a threshold. The first assignment may include a first resource assignment and a first interlace assignment. The method may further include transmitting the first assignment to a user equipment (UE) configured to transmit one or more of the beacon signals according to the first assignment.

In an aspect, the disclosure provides an apparatus for allocating resource blocks for uplink transmission. The apparatus may include a resource manager configured to manage resources for a downlink transmission. The resource manager may include a beacon signal component configured to determine a first assignment for beacon signals that are configured to increase bandwidth occupancy over a contention-based spectrum when a size of a payload of a downlink transmission is less than a threshold. The first assignment may include a first resource assignment and a first interlace assignment. The apparatus may further include a transmitter configured to transmit beacon signals according to the first assignment.

In an aspect, the disclosure provides a method for allocating resources for downlink transmission on a subframe of interlaced resource blocks. The method may include allocating a first assignment for the downlink transmission, the first assignment including a first resource block assignment and a first interlace assignment. The method may also include allocating a second assignment for beacon signals used to increase bandwidth occupancy, the second assignment including a second resource block assignment and a second interlace assignment. The method may further include transmitting the beacon signals according to the second resource block assignment and the second interlace assignment.

In an aspect, the disclosure provides an apparatus for allocating resources for downlink transmission. The apparatus may include a resource manager configured to manage resources for a downlink transmission. The resource manager may include a beacon signal component configured to determine a first assignment for beacon signals that are configured to increase bandwidth occupancy over a contention-based spectrum when a size of a payload of a downlink transmission is less than a threshold. The first assignment includes a first resource assignment and a first interlace assignment. The apparatus further may include a transmitter configured to transmit beacon signals according to the first assignment. The resource manager may include a payload component configured to determine a second assignment for the payload of the downlink transmission, wherein the second assignment includes a second resource assignment and a second interlace assignment. The transmitter is further configured to transmit the payload of the second assignment to the UE.

These and other aspects of the invention will become more fully understood upon a review of the detailed description, which follows.

BRIEF DESCRIPTION OF THE DRAWINGS

The accompanying drawings are presented to aid in the description of various aspects of the disclosure and are provided solely for illustration of the aspects and not limitation thereof.

FIGS. 6A and 6B illustrate an example of an assignment of interlaced resource blocks for a set of subframes, with channel usage beacon signal allocated to one unoccupied subframe.

DETAILED DESCRIPTION

Figure 1A:
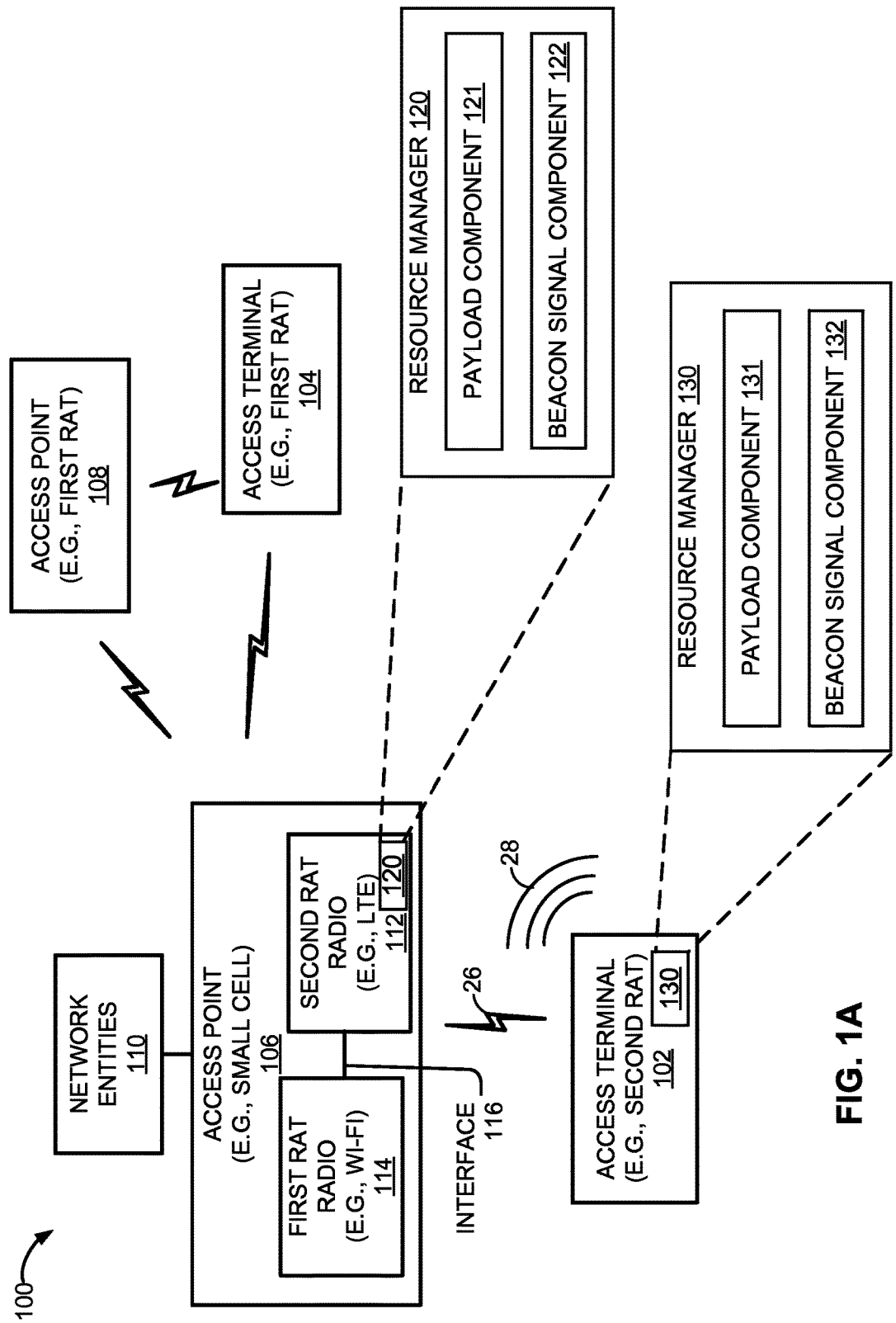
FIG. 1A is a simplified block diagram of several sample aspects of a communication system.

The disclosure relates in some aspects to band occupancy techniques for transmissions in unlicensed spectrum. Therefore, in aspects of the disclosure, methods and apparatuses are described in which a user equipment (UE) receives a first assignment for beacon signals configured to increase bandwidth occupancy over a contention-based spectrum when a size of an uplink grant for a payload of an uplink transmission is less than a threshold. The first assignment includes a first resource assignment and/or a first interlace assignment. The UE is further configured to transmit one or more of the beacon signals according to the first assignment.

Aspects of the disclosure are provided in the following description and related drawings directed to specific disclosed aspects. Alternate aspects may be devised without departing from the scope of the disclosure. Additionally, well-known aspects of the disclosure may not be described in detail or may be omitted so as not to obscure more relevant details. Further, many aspects are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, these sequence of actions described herein can be considered to be embodied entirely within any form of computer readable storage medium having stored therein a corresponding set of computer instructions that upon execution would cause an associated processor to perform the functionality described herein. Thus, the various aspects of the disclosure may be embodied in a number of different forms, all of which have been contemplated to be within the scope of the claimed subject matter. In addition, for each of the aspects described herein, the corresponding form of any such aspects may be described herein as, for example, "logic configured to" perform the described action.

When an LTE device is operating in an unlicensed or contention-based spectrum, a signal transmitted by the LTE device may need to occupy at least 80% of the designated bandwidth in order to maintain access to the spectrum. An interlace design may be used for both a physical uplink control channel (PUCCH) and a physical uplink shared channel (PUSCH) to spread data across the bandwidth in order to increase bandwidth occupancy. In some scenarios, however, a payload may be very small. For example, in some cases, a PUCCH payload may be a single resource block (RB). Similarly, payloads such as, for example, a VoLTE packet or TCP ACK message, may be relatively small (e.g., on the order of 1 RB). One solution is to use an entire interlace regardless of the size of the payload. For example, a lower modulation and coding scheme (MCS) and higher coding gain may be used to generate more coded bits to fill up more modulation symbols. Further, the power spectral density (PSD) may be reduced, but reducing the PSD may weaken the signal compared to potential interference. Further, for PUCCH transmissions, multiple UEs each using an entire interlace may consume significant resources, potentially limiting the number of UEs that could be served. Additionally, this solution does not address empty subframes between scheduled subframes.

In another aspect, an LTE device operating in unlicensed or contention-based spectrum may be subject to clear channel assessment (CCA) requirements. In an LTE system with multiple UEs, each UE may need to perform CCA before a transmission. It is possible that nearby UEs will block each other if the uplink signals are detected by the nearby UEs. A re-synchronization process may be used such that all UEs perform CCA at the same time and start transmitting at the same time. Such a re-synchronization system limits the flexibility of resource usage in LTE. Moreover, each UE's uplink transmission must be continuous after the re-synchronization, thereby preventing use of discontinuous uplink transmissions.

The current disclosure includes the use of a known bandwidth occupancy channel usage beacon signal (BO-CUBS) transmission to occupy bandwidth. The BO-CUBS may be known to the eNodeB and carry no information. Multiple UEs may transmit the BO-CUBS on the same resources forming a single frequency network (SFN). Accordingly, when a UE has a payload to transmit, the UE may maintain the code rate and PSD. When the UE has no payload to transmit but needs to maintain channel access, the UE may transmit the BO-CUBS to occupy the channel. The disclosed design allows the use of standard PUCCH transmission and standard MCS for PUSCH transmission. At the eNodeB, the modulation symbols are localized compared to spreading using the lower MCS or PSD. Moreover, because the BO-CUBS form a SFN, the eNodeB may easily detect and cancel the BO-CUBS. Even if not completely cancelled, the BO-CUBS may occupy only a single interlace, thereby minimizing interference to other interlaces. Additionally, the transmission of BO-CUBS may allow a UE to maintain access to the channel even though the uplink loading only supports discontinuous transmission. Further, the BO-CUBS may be used at the beginning of a radio frame to allow the UE to start payload transmission after the first subframe, which may allow for distribution of uplink traffic over time.

FIG. 1A illustrates several nodes of a sample communication system 100 (e.g., a portion of a communication network). For illustration purposes, various aspects of the disclosure will be described in the context of one or more access terminals, access points, and network entities that communicate with one another. It should be appreciated, however, that the teachings herein may be applicable to other types of apparatuses or other similar apparatuses that are referenced using other terminology. For example, in various implementations access points may be referred to or implemented as base stations, NodeBs, eNodeBs, Home NodeBs, Home eNodeBs, small cells, macro cells, femto cells, and so on, while access terminals may be referred to or implemented as user equipment (UEs), mobile stations, and so on.

Access points 106, 108 in the system 100 provide access to one or more services (e.g., network connectivity) for one or more wireless terminals (e.g., the access terminal 102 or the access terminal 104) that may be installed within or that may roam throughout a coverage area of the system 100. For example, at various points in time the access terminal 102 may connect to the access point 106 or some other access point in the system 100 (not shown). Similarly, the access terminal 104 may connect to the access point 108 or some other access point.

One or more of the access points may communicate with one or more network entities (represented, for convenience, by the network entities 110), including each other, to facilitate wide area network connectivity. Two or more of such network entities may be co-located and/or two or more of such network entities may be distributed throughout a network.

A network entity may take various forms such as, for example, one or more radio and/or core network entities. Thus, in various implementations, the network entities 110 may represent functionality such as at least one of: network management (e.g., via an operation, administration, management, and provisioning entity), call control, session management, mobility management, gateway functions, interworking functions, or some other suitable network functionality. In some aspects, mobility management relates to: keeping track of the current location of access terminals through the use of tracking areas, location areas, routing areas, or some other suitable technique; controlling paging for access terminals; and providing access control for access terminals.

Access point 106 may include a first RAT radio 114 and a second RAT radio 112. When the access point 106 (or any other devices in the system 100) uses a second RAT to communicate on a given resource, this communication may be subjected to interference from nearby devices (e.g., the access point 108 and/or the access terminal 104) that use a first RAT to communicate on that resource. For example, communication by the access point 106 via LTE using second RAT radio 112 on a particular unlicensed RF band may be subject to interference from Wi-Fi devices operating on that band. For convenience, LTE on an unlicensed RF band may be referred to herein as LTE/LTE Advanced in unlicensed spectrum, or simply LTE in the surrounding context. Moreover, LTE operating over an unlicensed spectrum may refer to the use or modification of LTE to operate in a contention-based communication system that uses a shared medium.

When access terminal 104 sends uplink transmissions to access point 106, assigned resources on the uplink frequency band are utilized. In an aspect, the access terminal 104 operating in an unlicensed RF band is required to occupy more than a minimum threshold of the bandwidth for a subframe (e.g., the minimum threshold or minimum bandwidth occupancy level may be 80%) in order to continue utilizing the assigned resources. For example, if the access terminal 104 does not occupy more than the minimum threshold of the bandwidth, another device (e.g., access point 108 or access terminal 104 may begin utilizing the unlicensed RF band and block the access terminal 102 from future transmissions. In an aspect, the access point 106 may assign beacon signals to resource blocks in such a way that bandwidth is occupied at or above the minimum threshold, as will be explained below in further detail.

In another aspect, when access point 106 assigns resources on the uplink frequency band, there may be a set of subframes allocated to the access terminal 102 in which one or more subframes may not have resource blocks allocated for payload, such as control information or data. The access point 106 may assign beacon signals on unoccupied subframes which may provide the opportunity for access terminal 104 to send a discontinuous uplink transmission, as will be explained below in further detail.

In another aspect, there may be occasions when access terminal 102 should transmit an unoccupied symbol. In such cases, the access point 106 may assign OFDM symbols in the uplink, with assignment of beacon signals to unoccupied symbols, thus allowing the access terminal to transmit discontinuous OFDM symbols without risking loss of the channel.

In some systems, LTE in unlicensed spectrum may be employed in a standalone configuration, with all carriers operating exclusively in an unlicensed portion of the wireless spectrum (e.g., LTE Standalone). In other systems, LTE in unlicensed spectrum may be employed in a manner that is supplemental to licensed band operation by providing one or more unlicensed carriers operating in the unlicensed portion of the wireless spectrum in conjunction with an anchor licensed carrier operating in the licensed portion of the wireless spectrum (e.g., LTE Supplemental DownLink (SDL)). In either case, carrier aggregation may be employed to manage the different component carriers, with one carrier serving as the Primary Cell (PCell) for the corresponding user equipment (UE) (e.g., an anchor licensed carrier in LTE SDL or a designated one of the unlicensed carriers in LTE Standalone) and the remaining carriers serving as respective Secondary Cells (SCells). In this way, the PCell may provide an FDD paired downlink and uplink (licensed or unlicensed), and each SCell may provide additional downlink capacity as desired.

In general, LTE utilizes orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, K may be equal to 128, 256, 512, 1024 or 2048 for system bandwidth of 1.25, 2.5, 5, 10 or 20 megahertz (MHz), respectively. The system bandwidth may also be partitioned into subbands. For example, a subband may cover 1.08 MHz, and there may be 1, 2, 4, 8 or 16 subbands for system bandwidth of 1.25, 2.5, 5, 10 or 20 MHz, respectively.

LTE may also use carrier aggregation. UEs (e.g., LTE-Advanced enabled UEs) may use spectrum of up to 20 MHz bandwidths allocated in a carrier aggregation of up to a total of 100 MHz (5 component carriers) used for transmission and reception. For the LTE-Advanced enabled wireless communication systems, two types of carrier aggregation (CA) methods have been proposed, continuous CA and non-continuous CA. Continuous CA occurs when multiple available component carriers are adjacent to each other. On the other hand, non-continuous CA occurs when multiple non-adjacent available component carriers are separated along the frequency band. Both non-continuous and continuous CA may aggregate multiple component carriers to serve a single unit of LTE-Advanced UEs.

In an aspect, an access point 106 may include a resource manager 120 for determining which resources to use for an uplink transmission based on the assignment granted by the access point 106. The resource manager 120 is shown as a component of LTE radio 112 as the resource assignments pertain to the LTE uplink transmissions. However, the resource manager 120 may be arranged in the access point 106 as a separate component. An access terminal 102 may include a resource manager 130 for allocating resources for uplink transmissions by the access terminal 102. It should be appreciated that any LTE wireless device may include a resource manager 120 or 130.

Resource manager 120 may include hardware, firmware, and/or software code executable by a processor for determining assignments for uplink transmissions and for determining assignments for beacon signals used to increase bandwidth occupancy. In particular, resource manager 120 may determine a payload size for an uplink transmission and determine whether to allocate assignments for beacon signals or instead reduce power spectral density for the uplink transmission. Resource manager 120 may include a 121 payload component and a beacon signal component 122. In an aspect, the term "component" as used herein may be one of the parts that make up a system, may be hardware or software, and may be divided into other components.

The payload component 121 may include hardware, firmware, and/or software code executable by a processor for determining the payload size for the uplink transmission and allocate resource blocks for the uplink transmission. For example, payload component 121 may include a receiver (not shown) configured to receive a request from access terminal 102 for access to a shared uplink channel (e.g., a physical uplink shared channel (PUSCH)). The payload component 121 may determine that the size of the payload is less than a threshold for bandwidth occupancy. In an aspect, payload component 121 may determine that the threshold is 10 resource blocks (RBs), which can be interlaced across a subframe to occupy a sufficient amount of the subframe bandwidth to satisfy the occupancy requirement (e.g., 80% bandwidth occupation for uplink transmission). If the payload component 121 determines that the uplink assignment is greater than 10 RBs, then the payload may be directly assigned according to an interlace assignment. If the payload component 121 determines that the uplink assignment is less than 10 RBs, then further processing may be performed by the beacon signal component 122.

Figure 4:
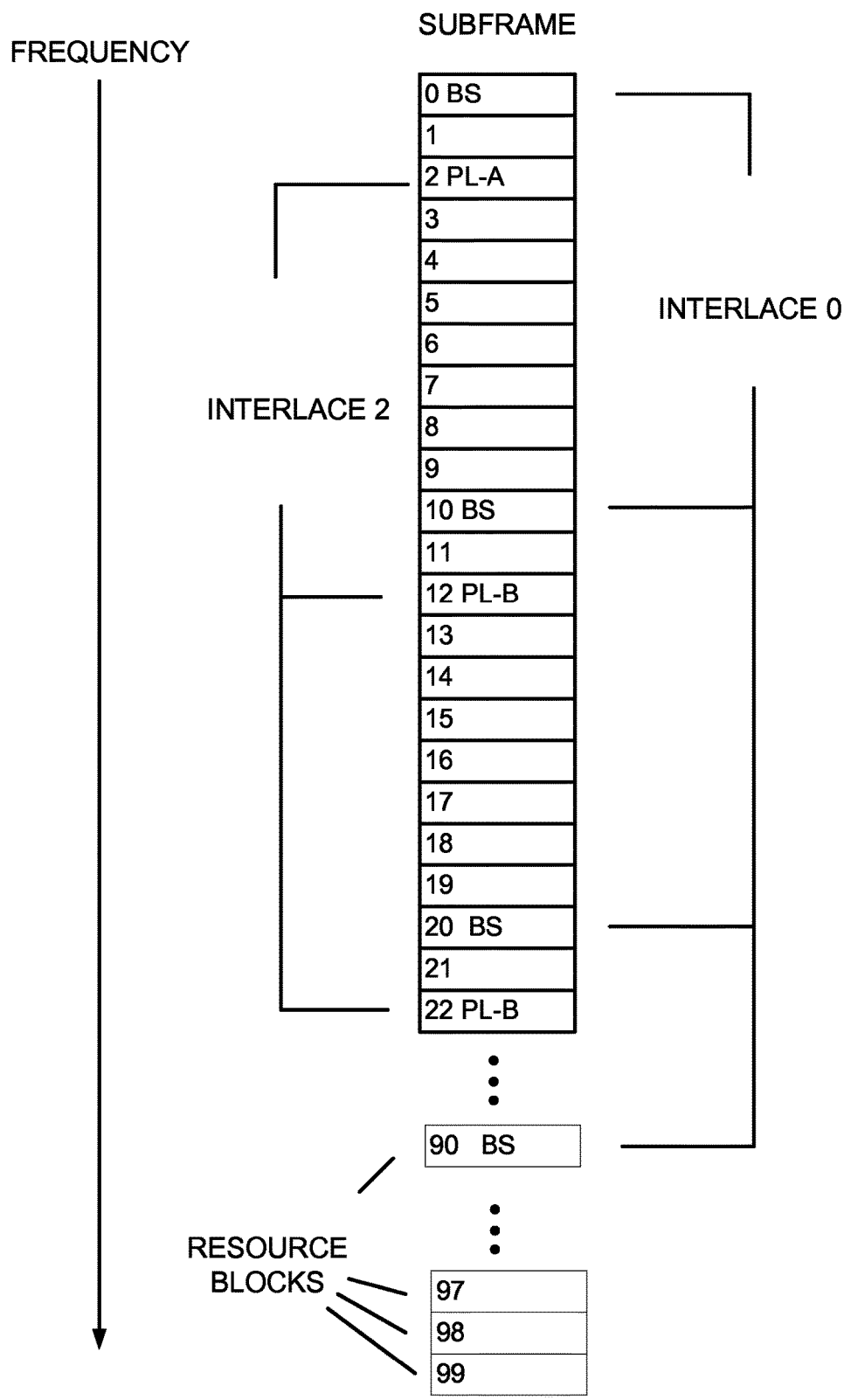
FIGS. 4-5 illustrate examples of an assignment of interlaced resource blocks for a subframe having a small uplink payload.

The beacon signal component 122 may include hardware, firmware, and/or software code executable by a processor to determine an interlace assignment for a beacon signal transmission associated with the payload transmission. As an example of interlacing resources on a subframe having 100 RBs, a channel usage beacon signal may be assigned to every $10^{th}$ RB (see, e.g., FIG. 4 showing interlaced beacon signal (BS)), which would result in ten beacon signals allocated to 10 RBs spread across the subframe. If the payload size is insufficient to occupy the uplink subframe bandwidth (e.g., a payload that only occupies one or a few RBs out of 100), then an interlaced beacon signal may be allocated to occupy the subframe. The occupancy of the subframe by the interlaced beacon signal may vary as needed to satisfy the occupancy requirements. Such a beacon signal assigned to an interlace across the subframe may operate as a bandwidth occupancy channel usage beacon signal (BO-CUBS). Examples of assignment of resources for beacon signals will be described later below. Beacon signal component 122 may include a processor (not shown) configured to perform the various functions of the beacon signal component 122. In an aspect, beacon signal component 122 may use information determined by payload component 121 for assigning beacon signal resource blocks that are not already allocated to the payload.

Figure 1B:
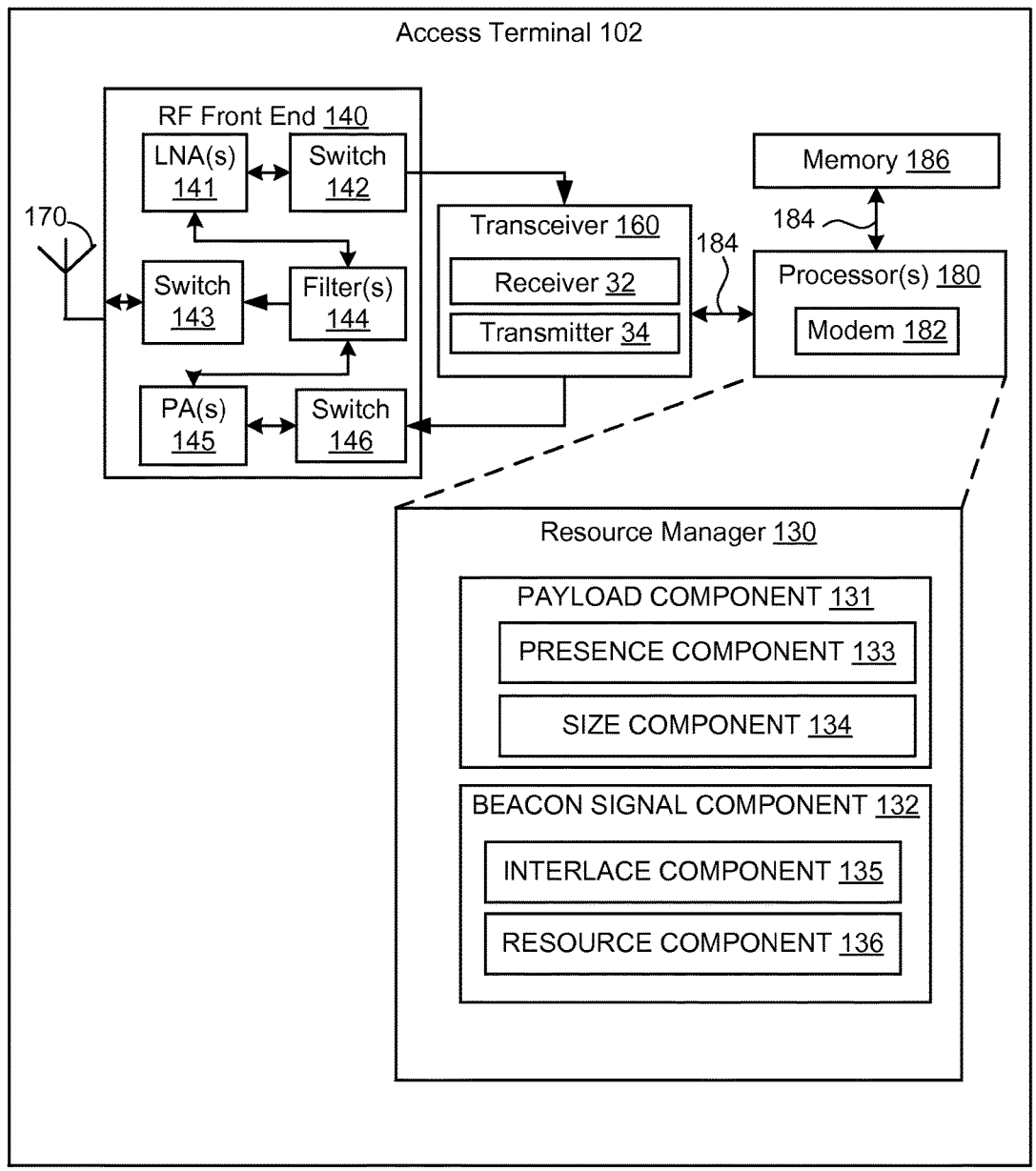
FIG. 1B is a simplified block diagram of an access terminal.

FIG. 1B illustrates aspects of an example access terminal 102. The resource manager 130 may be communicatively coupled to a transceiver 160, which may include a receiver 32 for receiving and processing RF signals and a transmitter 34 for processing and transmitting RF signals. The resource manager 130 may receive a first assignment for RBs to send an uplink transmission payload and a second assignment of RBs for sending bandwidth occupancy beacon signals. Resource manager 130 may include a 131 payload component and a beacon signal component 132. The payload component 131 may be configured to receive the payload allocation from access point 106, and set the uplink transmission channels accordingly. The beacon signal component 132 may be configured to receive the beacon signal allocation from access point 106, and set the uplink transmission channels with the appropriate interlaced beacon signal as assigned.

The receiver 32 may include hardware, firmware, and/or software code executable by a processor for receiving data, the code comprising instructions and being stored in a memory (e.g., computer-readable medium). The receiver 32 may be, for example, a radio frequency (RF) receiver. In an aspect, the receiver 32 may receive signals transmitted by the eNodeB 14. The receiver 32 may obtain measurements of the signals. For example, the receiver 32 may determine Ec/Io, SNR, a power amplitude of one or more signals, etc.

The transmitter 34 may include hardware, firmware, and/or software code executable by a processor for transmitting data, the code comprising instructions and being stored in a memory (e.g., computer-readable medium). The transmitter 34 may be, for example, a RF transmitter.

In an aspect, the one or more processors 180 can include one or more modem processors forming a modem 182. The various functions related to modem component 40 may be included in modem 182 and/or processors 180 and, in an aspect, can be executed by a single processor, while in other aspects, different ones of the functions may be executed by a combination of two or more different processors. For example, in an aspect, the one or more processors 180 may include any one or any combination of a modem processor, or a baseband processor, or a digital signal processor, or a transmit processor, or a transceiver processor associated with transceiver 160. In particular, the one or more processors 180 may implement components included in resource manager 130, including the payload component 131 and the beacon signal component 132.

The payload component 131 may include hardware, firmware, and/or software code executable by a processor for determining whether a size of a payload of an uplink transmission is less than a threshold. In an aspect, the payload component 131 may include a presence component 133 for determining whether a transmission is to occur in a current subframe and a size component 134 for determining the size of a payload. If no transmission is to occur in the current subframe, the payload component 131 may determine that the payload size is 0 and is less than the threshold. If a transmission is to occur, the payload component 131 may compare the payload size to the threshold to determine whether the size of the payload is less than the threshold.

The presence component 133 may determine whether a transmission is to occur in the current subframe based on, for example, a received assignment (e.g., uplink grant) for the access terminal 102, an unscheduled grant for the access terminal 102, a current transmission buffer size, or a transmitter state. In an aspect, the presence component 133 may determine that a payload is present for the current subframe when the current transmission buffer size is not empty, the access terminal 102 has an assignment for the current subframe, and the transmitter 34 is on. If the access terminal 102 does not have an assignment for the current subframe, the transmission buffer is empty, or the transmitter 34 is off, the presence component 133 may determine that the current subframe is an empty subframe and the payload size is 0.

The size component 134 may include hardware, firmware, and/or software code executable by a processor for determining the payload size for the uplink transmission. In an aspect, the size component 134 may determine the payload size based on a received uplink grant. For example, the received uplink grant may indicate specific resource blocks to use for a transmission. The size component 134 may, for example, determine that the payload size is the number of resource blocks indicated in the uplink grant. In another aspect, the size component 134 may determine a total size for the payload based on one or more components of the payload. For example, the payload of the uplink transmission may include a physical uplink control channel (PUCCH) payload, a physical uplink shared channel (PUSCH) payload, or both. In another aspect, the size component 134 may adjust the size of an uplink transmission, for example, if the uplink transmission is about equal to a threshold size. For example, the size component 134 may reduce the power spectral density for the uplink transmission and/or increase a coding rate in order to increase the payload size.

The beacon signal component 132 may include hardware, firmware, and/or software code executable by a processor for transmitting one or more beacon signals the first assignment in response to determining that the size of the payload of the uplink transmission is less than the threshold. In an aspect, the one or more of the beacon signals may increase bandwidth occupancy by the access terminal 102 over the contention-based spectrum. The beacon signal component 132 may include an interlace component 135 for determining an interlace on which to transmit the beacon signals and a resource component 136 for determining resources to use for transmitting the beacon signal. The interlace component 135 may, for example, determine the interlace based on an assignment received from the access point 106. The assignment may indicate the interlace to use for the payload and/or the beacon signal. If the assignment indicates separate interlaces for the payload the beacon signal, the interlace component may select the designated interlace for the beacon signal and transmit the beacon signal using the entire interlace. If the assignment indicates a common interlace for the payload and the beacon signal, the interlace component 135 may activate the resource component 136. The resource component 136 may determine which resource blocks of the common interlace to use for the beacon signal, and which resource blocks to use for the payload. In an aspect, the resource component 136 may determine the resource blocks for the payload based on the assignment, or may determine that the first resource blocks up to the payload size should be used for the payload. The resource component 136 may determine that the beacon signals should use any remaining resource blocks in the designated interlace. The beacon signal component 132 may arrange the payload and beacon signals for the transmission and transmit the payload and beacon signals in the current subframe via the transceiver 160.

Upon transmission of the uplink subframe by the access terminal 102, the access point 106 may receive the uplink transmission including the payload and the beacon signal and remove the beacon signal to obtain the payload from the subframe. The beacon signal may be configured to carry no information. The beacon signal may be a set of codes known by the access point 106 for easy cancellation to extract the payload of the received uplink channel. For example, the coding may use a scrambling sequence similar to a physical uplink control channel (PUCCH), and orthogonal to PUCCH transmissions having different cyclic shifts allocated to the subframe. The beacon signal may be configured to occupy the entire resource block allocated by the access point 106. For example, the LTE uplink subframe is defined by resource blocks that are of a size having 14 OFDM symbols by 12 subcarrier tones (14×12=168 resource elements); the beacon signal code set may occupy all 168 resource elements. The beacon signal may overlap a control channel (e.g., PUCCH) within the resource block in time and frequency domain, but may be distinguished by a different code shift.

Moreover, in an aspect, access terminal 102 may include RF front end 140 and transceiver 160 for receiving and transmitting radio transmissions, for example, communications 26 transmitted by the access point 106 and an UL BO-CUBS signal 28. For example, transceiver 160 may communicate with modem 182 to transmit signals (e.g., payload and BO-CUBS signals) generated by resource manager 130 and to receive messages (e.g. assignments) and forward them resource manager 130.

RF front end 140 may be connected to one or more antennas 170 and can include one or more low-noise amplifiers (LNAs) 141, one or more switches 142, 143, one or more power amplifiers (PAs) 145, and one or more filters 144 for transmitting and receiving RF signals. In an aspect, components of RF front end 140 can connect with transceiver 160. Transceiver 160 may connect to one or more modems 182 and processor 180, e.g., via a bus 184.

In an aspect, LNA 141 can amplify a received signal at a desired output level. In an aspect, each LNA 141 may have a specified minimum and maximum gain values. In an aspect, RF front end 140 may use one or more switches 142, 143 to select a particular LNA 141 and its specified gain value based on a desired gain value for a particular application. In an aspect, the RF front end 140 may provide measurements (e.g., Ec/Io) and/or applied gain values to the modem component 40.

Further, for example, one or more PA(s) 145 may be used by RF front end 140 to amplify a signal for an RF output at a desired output power level. In an aspect, each PA 145 may have a specified minimum and maximum gain values. In an aspect, RF front end 140 may use one or more switches 143, 146 to select a particular PA 145 and its specified gain value based on a desired gain value for a particular application.

Also, for example, one or more filters 144 can be used by RF front end 140 to filter a received signal to obtain an input RF signal. Similarly, in an aspect, for example, a respective filter 144 can be used to filter an output from a respective PA 145 to produce an output signal for transmission. In an aspect, each filter 144 can be connected to a specific LNA 141 and/or PA 145. In an aspect, RF front end 140 can use one or more switches 142, 143, 146 to select a transmit or receive path using a specified filter 144, LNA, 141, and/or PA 145, based on a configuration as specified by transceiver 160 and/or processor 180.

Transceiver 160 may be configured to transmit and receive wireless signals through antenna 170 via RF front end 140. In an aspect, the transceiver 160 may be tuned to operate at specified frequencies such that access terminal 102 can communicate with, for example, access point 106. In an aspect, for example, modem 182 can configure transceiver 160 to operate at a specified frequency and power level based on the configuration of the access terminal 102 and communication protocol used by modem 182.

In an aspect, modem 182 can be a multiband-multimode modem, which can process digital data and communicate with transceiver 160 such that the digital data is sent and received using transceiver 160. In an aspect, modem 182 can be multiband and be configured to support multiple frequency bands for a specific communications protocol. In an aspect, modem 182 can be multimode and be configured to support multiple operating networks and communications protocols. In an aspect, modem 182 can control one or more components of access terminal 102 (e.g., RF front end 140, transceiver 160) to enable transmission and/or reception of signals from the network based on a specified modem configuration. In an aspect, the modem configuration can be based on the mode of the modem and the frequency band in use. In another aspect, the modem configuration can be based on configuration information associated with access terminal 102 as provided by the network during cell selection and/or cell reselection.

Access terminal 102 may further include a memory 186, such as for storing data used herein and/or local versions of applications or resource manager 130 and/or one or more of its subcomponents being executed by processor 180. Memory 186 can include any type of computer-readable medium usable by a computer or processor 180, such as random access memory (RAM), read only memory (ROM), tapes, magnetic discs, optical discs, volatile memory, non-volatile memory, and any combination thereof. In an aspect, for example, memory 186 may be a computer-readable storage medium that stores one or more computer-executable codes defining resource manager 130 and/or one or more of its subcomponents, and/or data associated therewith, when access terminal 102 is operating processor 180 to execute resource manager 130 and/or one or more of its subcomponents. In another aspect, for example, memory 186 may be a non-transitory computer-readable storage medium.

Figure 2A:
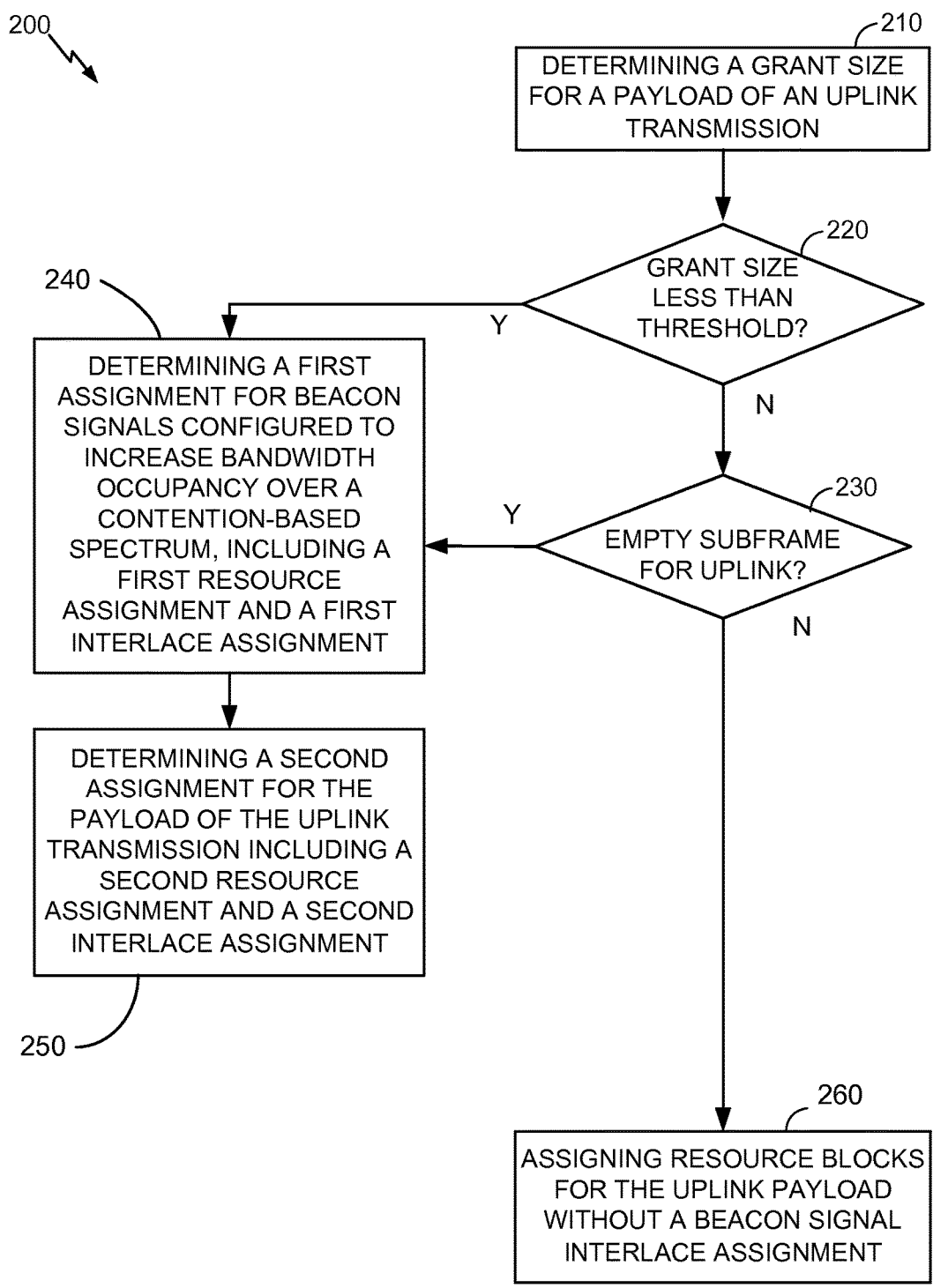
FIG. 2A is a flow diagram illustrating an example method of allocating resource blocks for payload and beacon signals in an uplink transmission.

FIG. 2A is a flow diagram illustrating an example method 200 of resource allocation for uplink transmission. The method may be performed by an eNodeB (e.g., the access point 106 illustrated in FIG. 1A) to allocate resources to one or more UEs (e.g., the access terminal 102 illustrated in FIGS. 1A and 1B). At block 210, the method 200 may include determining a grant size for a payload of an uplink transmission. For example, payload component 121 (FIGS. 1A and 1B) may determine the grant size based on the payload size and channel conditions.

At block 220, the method 200 may include determining whether a grant size for the payload is less than a threshold. For example, for an interlaced uplink assignment where 10 resource blocks are interlaced across 100 available assignments in the subframe bandwidth, to achieve 90% occupancy, which is greater than an 80% occupancy requirement, then the threshold may be set at 10 RBs. In an aspect, bandwidth occupancy may refer to a portion of a total available bandwidth occupied by a transmission. For example, the bandwidth occupancy may be measured from a lowest frequency sub-carrier to a highest frequency-sub-carrier. Accordingly, in the above example, if the interlace includes every $10^{th}$ sub-carrier, the spacing between a lowest sub-carrier (e.g., 1) and a highest subcarrier (e.g. 91) may be approximately 90 sub-carriers. The payload component 121 may determine if the grant size for the payload is less than the threshold. If the grant size for the payload is less than the threshold, then method 200 may proceed to block 240. If the grant size for the payload is not less than the threshold, then method 200 may proceed to block 230. One example of small data transmission on the uplink is VoLTE and TCP ACK, where the size of the PUSCH bursts is short and significantly less than the threshold for occupancy.

At block 230, the method 200 may include determining whether there are any empty subframes within a set of allocated subframes (e.g., between subframes for which assignments for payloads have been allocated or for which no scheduling information was received). For example, the payload component 121 may be configured to determine whether a subframe will be empty. In an aspect, the access point 106 may determine that an access terminal 104 will transmit an empty subframe when no scheduling information is received, the scheduling information indicates no uplink data, or the access point 106 determines not to schedule the access terminal 104 during the subframe. If the subframe will be empty, then the method 200 may include allocating a first assignment for a beacon signal to maintain bandwidth occupancy during the empty subframe.

At block 240, the method 200 may include determining a first assignment for beacon signals including a first resource assignment and/or a first interlace assignment. The beacon signals may increase bandwidth occupancy over a contention based spectrum. For example, the beacon signal component 122 may determine that if only 1 RB is required to transmit the payload, and the threshold is 10 RBs, then beacon signals may be assigned for the remaining 9 RBs on the interlace.

At block 250, the method 200 may include determining a second assignment for the payload of the uplink transmission including a resource assignment and a second interlace assignment. For example, the payload component 121 may be configured to determine the assignment. In an aspect, the resource assignment may be based on the grant size. That is, the resource assignment may assign specific resource blocks for the payload. In an aspect, the second interlace assignment may be the same as the first interlace assignment, or may assign a different interlace for the payload of the uplink transmission. In an aspect, the second assignment may also indicate a transmission power for the beacon and data, so that a power spectral density limitation (e.g., a per MHz power limitation) is satisfied.

Returning to block 220, if the grant size for the payload is not less than the threshold, and if in block 230, the subframe is not empty, then the method 200 may proceed to block 260. At block 260, the method 200 may include assigning resource blocks for the uplink payload without a beacon signal interlace assignment (block 280).

Figure 2B:
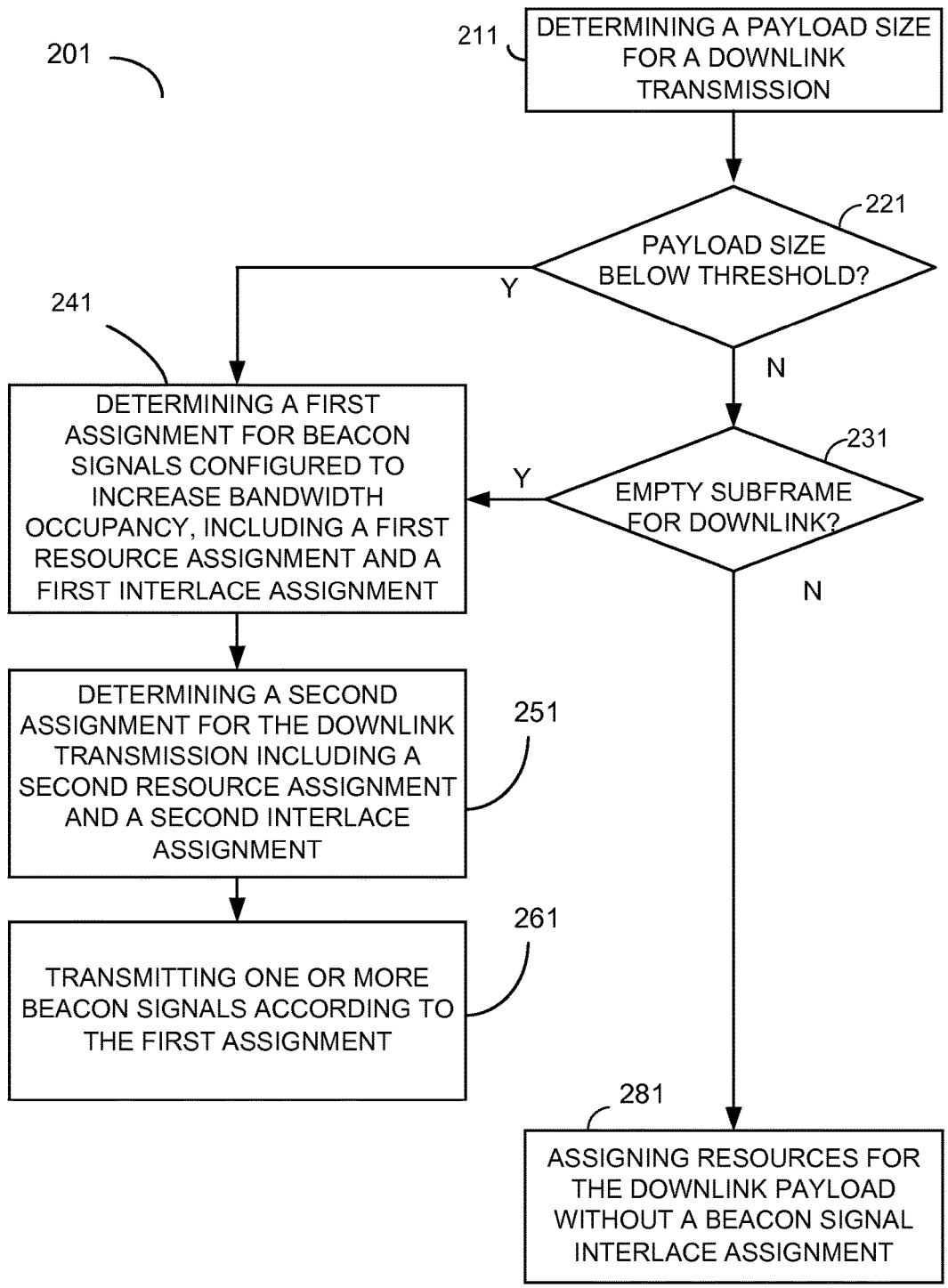
FIG. 2B is a flow diagram illustrating an example method of allocating resource blocks for payload and beacon signals in a downlink transmission.

FIG. 2B is a flow diagram illustrating an example method 201 of resource allocation for downlink transmission. The method may be performed by an eNodeB (e.g., the access point 106 illustrated in FIG. 1A) to determine resources for downlink transmission. For example, the method 201 may be used by the eNodeB to transmit a downlink BO-CUBS in order to increase bandwidth occupancy on a downlink channel in unlicensed or contention-based spectrum.

At block 211, the method 201 may include determining a payload size for a downlink transmission. For example, payload component 121 (FIGS. 1A and 1B) may determine the payload size, including data packets for multiple UEs and the control channels, for the downlink transmission. The control channels may include, for example, ePDCCH and CSI-RS for channel estimation. In an aspect, the payload component 121 may determine the payload size for a downlink transmission. For example, determining the payload size may include determining a number or position of resource blocks for transmitting the payload. For example, the number of resource blocks may vary based on channel conditions, so payloads of the same size may require different resources under different conditions.

At block 221, the method 201 may include determining whether the payload size is less than a threshold. The payload component 121 may determine if the payload size is less than the threshold. If the payload size is less than the threshold, then method 201 may proceed to block 241. If the payload size is not less than the threshold, then method 201 may proceed to block 231.

At block 231, the method 201 may include determining whether there are any empty subframes within a set of allocated subframes. For example, the payload component 121 may be configured to determine whether the set of allocated subframes (e.g. within a radio frame) includes any empty subframes. If so, then the method 201 may include allocating a first assignment for a beacon signal configured to increase bandwidth occupancy over a contention-based spectrum and the method 201 may proceed to block 241.

At block 241, the method 201 may include determining a first assignment for beacon signals including a first resource assignment and/or a first interlace assignment. The beacon signal may be configured to increase bandwidth occupancy over a contention based spectrum. For example, the beacon signal component 122 may determine that if only 1 RB is required to transmit the payload, and the threshold is 10 RBs, then beacon signals may be assigned for the remaining 9 RBs on the first interlace. In an aspect, the beacon signal component 122 may assign the entire first interlace for the beacon signal.

At block 251, the method 201 may include determining a second assignment for the payload of the downlink transmission including a second resource assignment and a second interlace assignment. For example, the payload component 121 may be configured to determine the assignment. In an aspect, the payload component 121 may determine to transmit the payload in a second interlace that is different than the first interlace for the beacon signal. In another aspect, the payload component 121 may determine to transmit the payload on the same interlace as the beacon signal. The payload may be transmitted on the blocks assigned for the payload instead of the beacon signal.

In block 261, the method 201 may include transmitting one or more beacon signals according to the first assignment. In an aspect, a transmitter at the eNodeB (e.g., transmitter 1124 in FIG. 11) may transmit the beacon signal. In an aspect, the transmitter may use a transmission power for the beacon and data, so that a power spectral density limitation (e.g., a per MHz power limitation) is satisfied.

Returning to block 221, if the payload size is not below the threshold, and if there is no empty subframe for uplink in block 231, then the method 201 may proceed to block 271. In block 271, the method 200 may include assigning resource blocks for the downlink payload without a beacon signal interlace assignment.

In one aspect for the methods 200, 201, the interlace for the beacon signal may hop over time. In another aspect, the eNodeB may select any interlace for the uplink or downlink beacon signals. The interlace of the uplink beacon signal can be the same for all UEs (i.e., a single interlace), or alternatively, each UE may be allocated its own respective interlace for a beacon signal. The eNodeB may allocate a beacon signal interlace for each UE individually for each transmission. Alternatively, the eNodeB may use radio resource control (RRC) signaling to assign the interlace in a sticky fashion. In an aspect, the eNodeB may put the beacon signal assignment in a system information block (SIB) as an eNodeB-wide parameter. The UE may then automatically transmit an interlaced beacon signal when the size of the data transmission assignment is below the threshold for occupancy, or when a subframe set allocation includes an empty subframe.

Figure 3A:
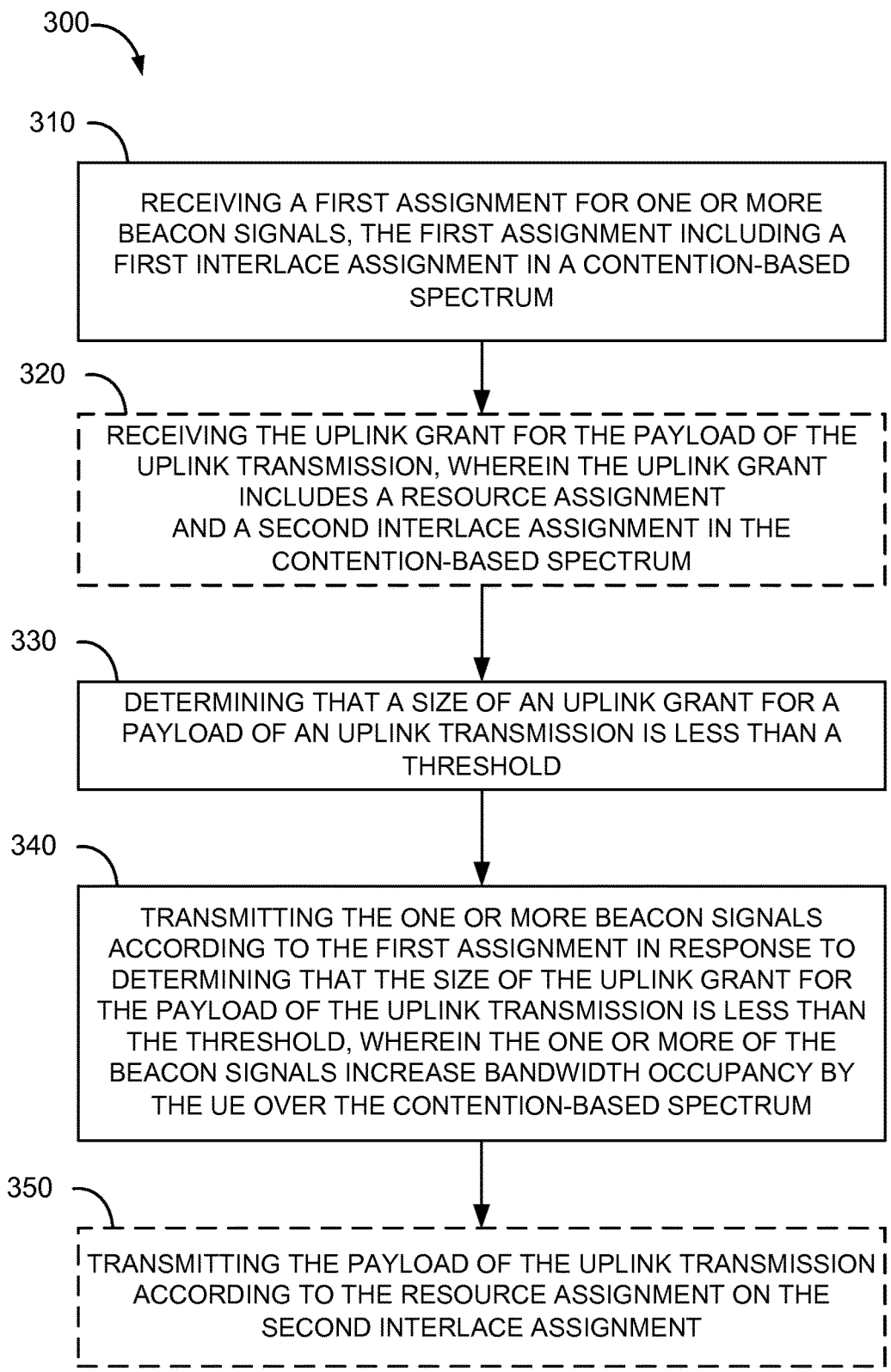
FIG. 3A is a flow diagram illustrating an example method for receiving resource allocation for uplink transmission.

FIG. 3A is a flow diagram illustrating an example method 300 of resource allocation for uplink transmission. The method may be performed by a UE (e.g., the access terminal 102 illustrated in FIGS. 1A and 1B). At block 310, the method 300 may include receiving a first assignment for one or more beacon signals, the first assignment including a first interlace assignment in a contention-based spectrum. For example the beacon signal component 132 may be configured to receive the first assignment. The first assignment may be received when a size of an uplink grant for a payload of the uplink transmission falls below a threshold (e.g., as determined by an eNodeB based on scheduling requests by the UE). As another example, the first assignment may be received when one or more subframes are allocated to the UE with no resource block assignments for payload, which would result in one or more empty subframes within a set of assigned subframes. In this case, the beacon signal may be allocated to occupy the empty subframes. In another aspect, the first assignment may be received at any time before a subframe having a payload size less than the threshold. For example, the first assignment may be received in a message (e.g. a SIB) broadcast by the cell or in RRC signaling.

At block 320, the method 300 may optionally include receiving the uplink grant for the payload of the uplink transmission, wherein the uplink grant includes a resource assignment and a second interlace assignment in the contention-based spectrum. For example, the payload component 131 may be configured to receive the second assignment. In an aspect, the resource assignment may include an assignment of resource blocks or an assignment of orthogonal frequency division multiplexing (OFDM) symbols within a subframe.

At block 330, the method 300 may include determining that a size of an uplink grant for a payload of an uplink transmission is less than a threshold. In an aspect, for example, the size component 134 may determine that the size of the payload of the uplink transmission is less than the threshold. For example, the size component 134 may compare the size of the payload to the threshold. In another aspect, the size component 134 may determine that the size of the uplink grant for the payload of the uplink transmission is less than the threshold in response to receiving a first assignment specifically for a specific subframe. For example, the eNodeB may provide a first assignment for a beacon signal in a specific subframe when the eNodeB determines that the size of the payload of the uplink transmission is less than the threshold. In another aspect, the presence component 133 may determine that the size of the uplink grant for the payload of the uplink transmission is less than the threshold when the current subframe is empty or includes an empty payload. In another aspect, the size of the uplink grant for the payload of the uplink transmission may be less than the threshold when the resource assignment assigns resources after a first resource block or a first OFDM symbol within the subframe.

At block 340, the method 300 may include transmitting the one or more beacon signals according to the first assignment in response to determining that the size of the payload of the uplink transmission is less than the threshold, wherein the one or more of the beacon signals increase bandwidth occupancy by the UE over the contention-based spectrum. In an aspect, for example, the transmitter 34 may transmit the one or more beacon signals according to the first assignment in response to the presence component 133 or size component 134 determining that the size of the payload of the uplink transmission is less than the threshold. For example, the beacon signal may be transmitted when the number of assigned resource blocks is less than the threshold or when the sub-frame is empty. In another aspect, the beacon signal may be transmitted in the first resource block or the first OFDM symbol of a subframe and in any subsequent resource block or OFDM symbols before the assigned resources.

In block 350, the method 300 may optionally include transmitting the payload of the uplink transmission according to the resource assignment on the second interlace assignment. In an aspect, for example, the transmitter 34 may transmit the payload of the uplink transmission according to the second resource assignment on the second interlace assignment.

In one aspect of the method 300, the transmitter 34 may transmit the interlaced beacon signal with a transmit power different than for the payload. Also, the transmission for each beacon signal RB need not have the same transmit power. For example, if there is a maximum transmit power threshold for the subframe of 20 dB to meet power spectral density requirements, and the payload size demands a transmit power of 15 dB, then the interlaced beacon signal transmit power may be adjusted to remain below 5 dB. The transmit power for the beacon signal RBs may also be controlled to maintain uniform transmit power over the subframe. For example, if there are several payload RBs in proximity to a first beacon signal RB, but none near a second beacon signal RB, then the first beacon signal RB may have its transmit power controlled to a lower level to account for the transmit power of the nearby payload RBs.

Figure 3B:
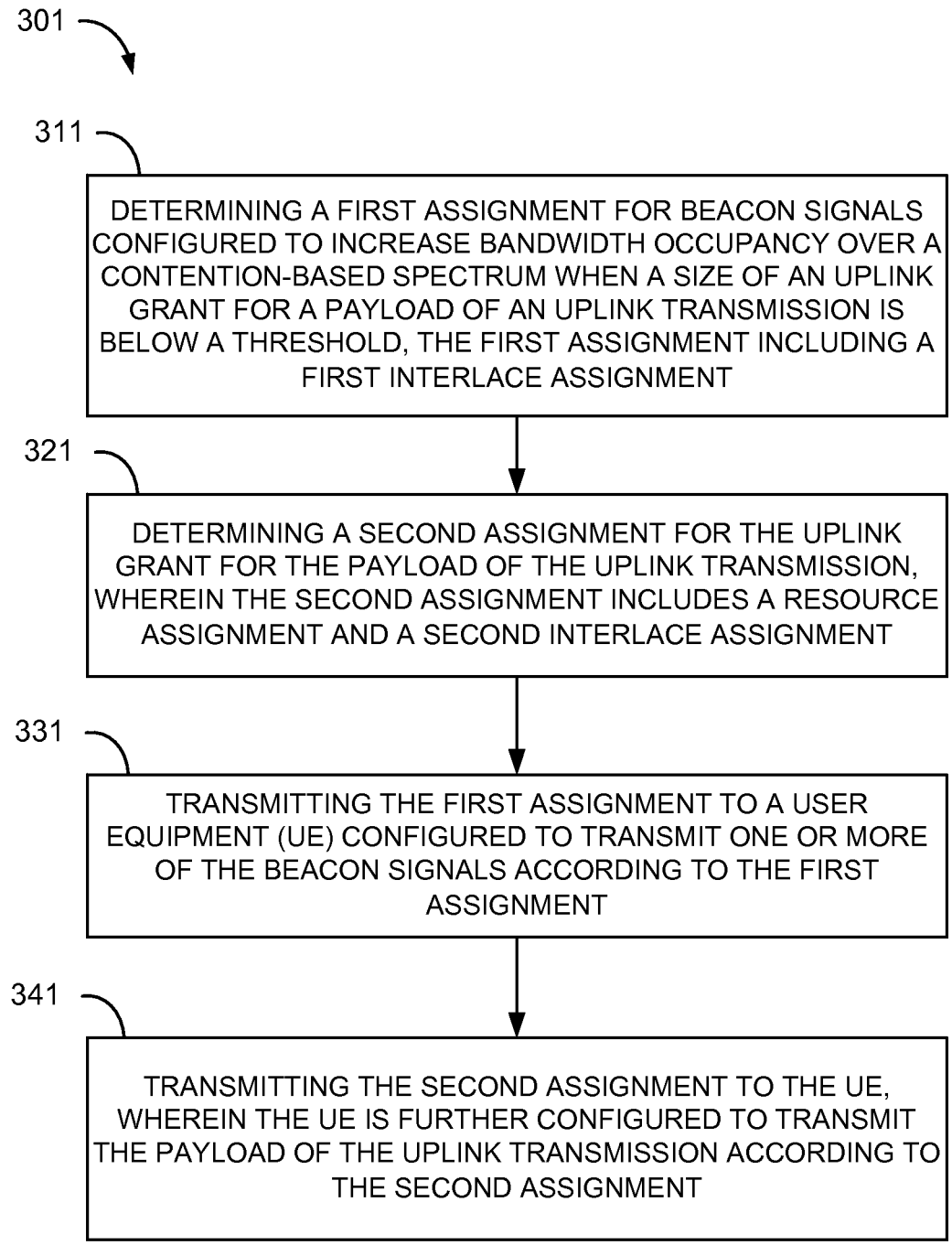
FIG. 3B is a flow diagram illustrating an example method for determining resource allocation for uplink transmission.

FIG. 3B is a flow diagram illustrating an example method 301 of determining assignment of resources for uplink transmission on an unlicensed band. The method may be performed by the access point 106 illustrated in FIG. 1A.

At block 311, the method 301 may include determining a first assignment for beacon signals configured to increase bandwidth occupancy over a contention-based spectrum when a size of an uplink grant for a payload of an uplink transmission is below a threshold, the first assignment including a first interlace assignment. For example the beacon signal component 122 may be configured to determine the first assignment. The beacon signal allocation may be determined when the grant size for the payload of the uplink transmission is less than a threshold. As another example, the beacon signal allocation may be determined when one or more subframes are allocated to the UE with no resource block assignments for payload, which would result in one or more empty subframes within a set of assigned subframes. In this case, the beacon signal may be allocated to occupy the empty subframes. In another aspect, the beacon signal component 122 may determine the first assignment for the beacon signals at any time. For example, the interlace used for beacon signals may be fixed, and the access terminal 102 may use the first assignment for a beacon signal whenever an uplink grant size is less than a threshold.

At block 321, the method 301 may include determining a second assignment for the uplink grant for the payload of the uplink transmission, wherein the second assignment includes a resource assignment and a second interlace assignment. In an aspect, for example, the payload component 121 may be configured to determine the second assignment for one or more access terminals 102. In an aspect, the second assignment may be based on scheduling information received from the access terminal 102 indicating an amount of data in a transmission buffer. The second assignment may also be based on scheduling for multiple access terminals, priority, and/or channel condition.

At block 331, the method 301 may include transmitting the first assignment to a user equipment (UE) (e.g. access terminal 102) configured to transmit the one or more beacon signals according to the first assignment. In an aspect, for example, the first assignment may be transmitted to the UE with the second assignment for the uplink grant for one or more subframes. Accordingly, the access point 106 may determine whether the UE transmits one or more beacon signals in each subframe. In another aspect, the first assignment may be transmitted to the UE as a broadcast message or as RRC signaling.

At block 341, the method 301 may include transmitting the second assignment to the UE, wherein the UE is further configured to transmit the payload of the uplink transmission according to the second assignment. In an aspect, for example, the resource manager 120 may transmit the second assignment. In an aspect, the second assignment may be combined in a single transmission with the first assignment. In an aspect, the first assignment and/or the second assignment may be referred to as an uplink grant or be part of an uplink grant.

FIG. 4 illustrates an example of an assignment of interlaced resource blocks. In this example, the payload size for the subframe is three RBs. The payload component 121 may assign the uplink payloads to interlace 2. The UE having payload PL-A and a payload PL-B for uplink transmission has received allocation for payload on interlace 2, in particular at RB2, RB12 and RB22. Since having only three RBs allocated for payload is less than a threshold of 10 RBs to provide sufficient bandwidth utilization, the beacon signal component 122 may assign a beacon signal BS to resource blocks on interlace 0 (i.e., at RB0, RB10, RB20 . . . RB90). As an example, PL-A may represent a control channel (e.g., PUCCH) and PL-B may represent a shared channel (e.g., PUSCH). For the case of multiple UEs, each PUCCH for a respective UE may be small enough to fit in a single RB allocation, using a code division multiplexing. Similarly, the PUSCH of PL-B may be assigned to different UEs, where the payload of a first UE is assigned RB12, and the payload PL-B for a second UE is assigned to RB22. As another example, the allocation for the payload may relate to different UEs, where PL-A is a payload for a first UE and PL-B is a payload for a second UE in the small cell of access point 106. Accordingly, an eNodeB may efficiently allocate resources by assigning resource blocks within the same interlace to different UEs. As a result, however, the transmission of the payload from each UE may have a bandwidth occupancy less than a threshold. The eNodeB may configure each of the UEs to also transmit BS on interlace 2. As a result, the bandwidth occupancy for this allocation for each UE is approximately 90% (i.e., spanning between RB0 and RB90 within a band of 100 RBs). With the beacon signal assigned to the same interlace for the different UEs, a single frequency network (SFN) may be established. In another aspect, multiple access points may coordinate to have synchronous beacon signals on the same interlace.

Figure 5:
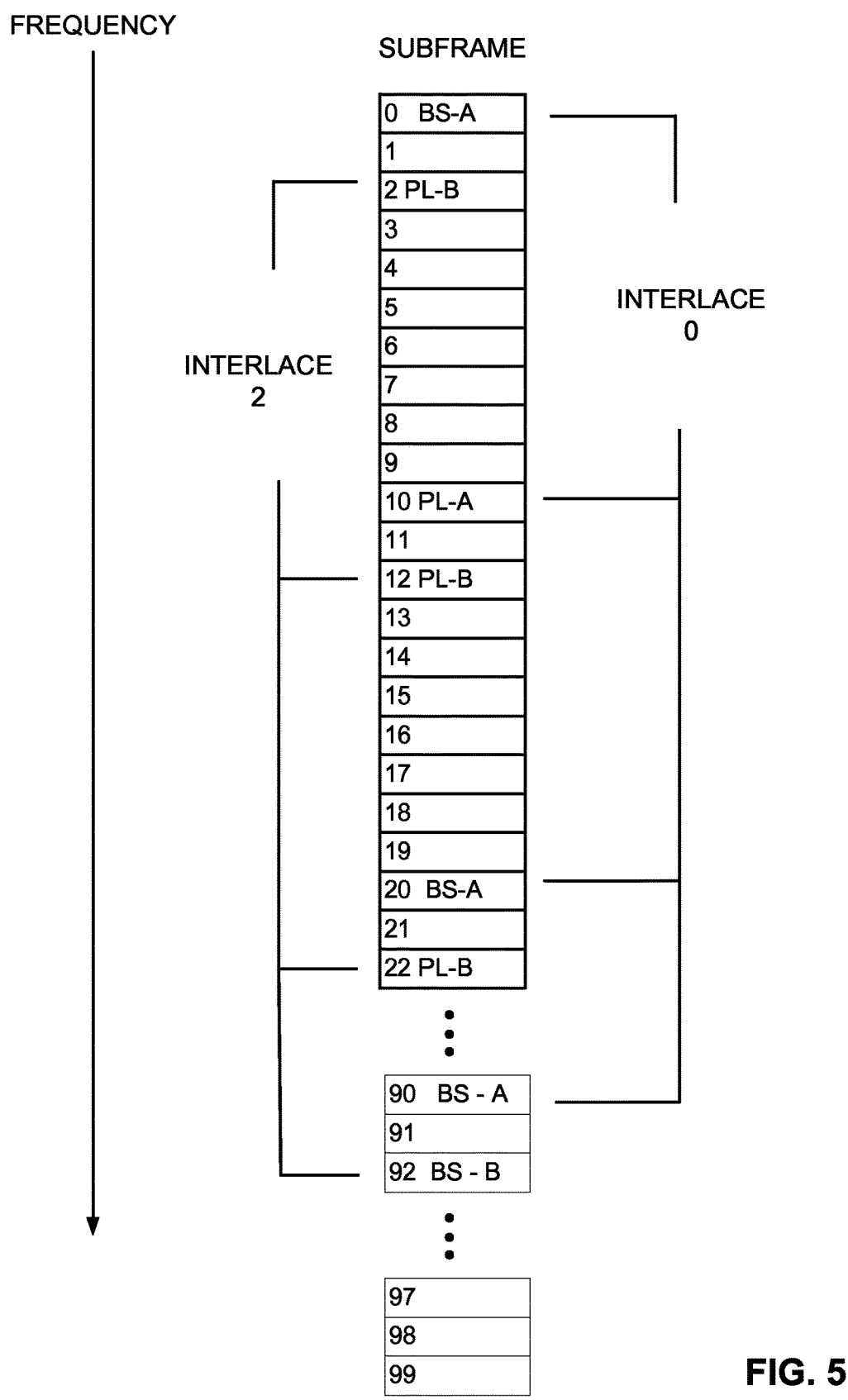

FIG. 5 illustrates an alternative example of an assignment of interlaced resources. In this example, the payload size for the subframe is one RB for a first payload transmitted by a first UE, shown as PL-A, and the payload size is two RBs for a second payload transmitted by a second UE, shown as PL-B. The payload component 121 may determine that the size of payload PL-A is below the threshold, assign interlace 0 for the payload, and assign a resource block RB10 on interlace 0 for the uplink transmission of payload PL-A. The beacon signal component 122 may assign different beacon signals, each associated with a respective payload or UE. For example, beacon signal component 122 may assign interlace 0 for a beacon signal BS-A associated with payload PL-A, and may allocate all RBs on interlace 0 except for RB 10, which is occupied by payload PL-A as assigned. As a result, the bandwidth occupancy for the payload PL-A and the BS-A is 10 RBs, or about 90%. For payload PL-B, the beacon signal component 122 may assign an interlace 2 for a second and different beacon signal BS-B, allocating resource blocks unoccupied by the payload PL-B (i.e., RB22, RB32 . . . RB92). In this example, the access point 106 has allocated multiple and different beacon signals for different access terminals 104, 102 in the network.

FIG. 6A illustrates an example of an assignment of resource blocks on a set of subframes 401-403. As shown, a payload (PL) may be allocated on RB3, RB13 and RB98 in subframes 401 and 403; however no payload is assigned to subframe 402 due to light uplink load for example. In this example, the UE may be required to perform a CCA prior to uplink transmission on subframe 403, and may lose the channel prior to the opportunity to transmit in subframe 403.

As a solution, FIG. 6B illustrates the same set of subframes 401-403, where a beacon signal BS allocated to an interlace 0 onto RB0, RB10, RB20 . . . RB90. Here, by transmission of the beacon signal BS on the subframe 402, the UE retains access to the uplink channel without having to perform CCA.

Figure 7:
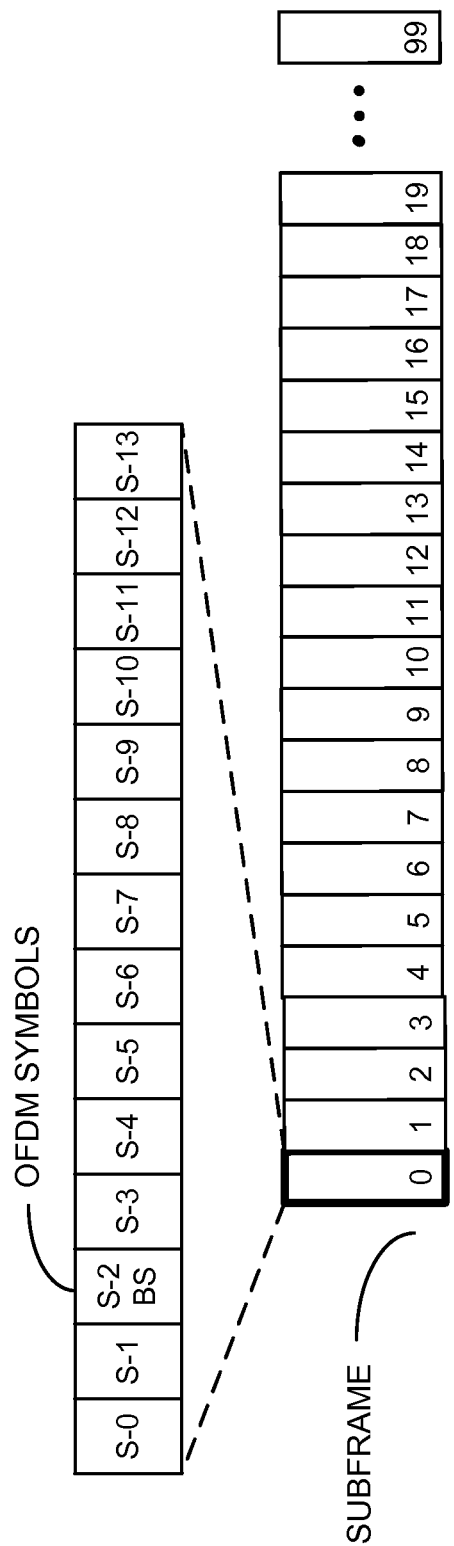
FIG. 7 illustrates an example assignment of a channel usage beacon signal for an unoccupied OFDM symbol in a subframe.

FIG. 7 illustrates assignment of a channel usage beacon signal for unoccupied OFDM symbols in a subframe. A subframe for uplink transmission is shown having multiple OFDM symbols S-0 to S-13. In this example, the eNodeB may schedule uplink transmissions for multiple UEs, assigning beacon signals in particular OFDM symbols to avoid interfering with other transmissions and vice-versa. In this example, the eNodeB may have to two UEs, UE0 and UE1, that need uplink transmissions scheduled. The UE0 and UE1 may try to access the uplink channel by sending an uplink channel usage beacon signal (U-CUBS) at the same time. If the CCA for UE1 fails, then only UE0 may commence uplink access. If operating in a WiFi network, for UE1 to attempt again in the next subframe, UE1 may be required to send a WiFi preamble in OFDM symbol S-2 to notify a nearby WiFi access point of the UE1 transmission. This preamble may be a wideband signal and the eNodeB may recognize that it will interfere with UE0 transmission in OFDM symbol S-2. Hence the eNodeB may assign UE0 a beacon signal BS (e.g., a BO-CUBS) for OFDM symbol S-2 so that the UE0 does not lose the channel by interference with the UE1 WiFi preamble. If one the other hand, the eNodeB were to schedule a blank UE0 transmission for that OFDM symbol, UE0 cannot restart transmitting in the next OFDM symbol S-3 without a CCA. Such a CCA would be dominated by the UE1 WiFi preamble transmission and the CCA for UE0 would not pass and UE0 would lose the channel. Hence, assigning the channel occupancy beacon signal BS in S-2 for UE0 avoids loss of the channel for UE0.

In an alternative example, the UE0 uplink transmission needs a blank assignment for OFDM symbol S-2, because interference with this OFDM symbol from a downlink transmission is likely to occur. The eNodeB may assign a channel usage beacon signal BS at symbol S-2 so that the UE0 does not lose the channel.

Figure 8:
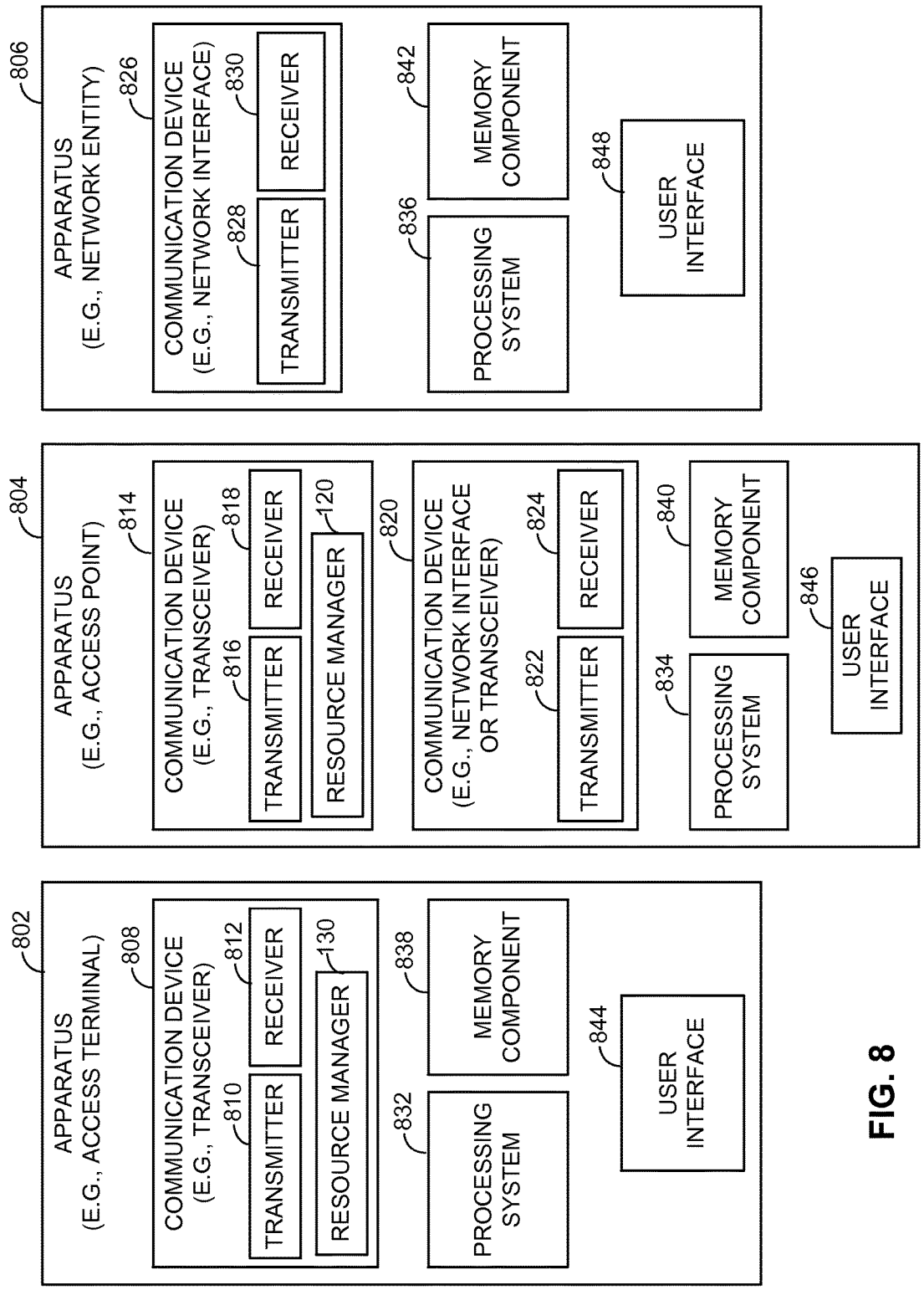
FIG. 8 is a simplified block diagram of several sample aspects of components that may be employed in communication nodes.

FIG. 8 illustrates several sample components (represented by corresponding blocks) that may be incorporated into an apparatus 802, an apparatus 804, and an apparatus 806 (e.g., corresponding to an access terminal, an access point, and a network entity, respectively) to support techniques for bandwidth occupancy for transmission in unlicensed spectrum as taught herein. The apparatus 802 and the apparatus 804, for example, may include a resource manager 120 and 130 respectively for determining which resource blocks to use for uplink transmission of payload and beacon signals. It should be appreciated that these components may be implemented in different types of apparatuses in different implementations (e.g., in an ASIC, in an SoC, etc.). The described components also may be incorporated into other apparatuses in a communication system. For example, other apparatuses in a system may include components similar to those described to provide similar functionality. Also, a given apparatus may contain one or more of the described components. For example, an apparatus may include multiple transceiver components that enable the apparatus to operate on multiple carriers and/or communicate via different technologies.

The apparatus 802 and the apparatus 804 each include at least one wireless communication device (represented by the communication devices 808 and 814 (and the communication device 820 if the apparatus 804 is a relay)) for communicating with other nodes via at least one designated radio access technology. Each communication device 808 includes at least one transmitter (represented by the transmitter 810) for transmitting and encoding signals (e.g., messages, indications, information, and so on) and at least one receiver (represented by the receiver 812) for receiving and decoding signals (e.g., messages, indications, information, pilots, and so on). Similarly, each communication device 814 includes at least one transmitter (represented by the transmitter 816) for transmitting signals (e.g., messages, indications, information, pilots, and so on) and at least one receiver (represented by the receiver 818) for receiving signals (e.g., messages, indications, information, and so on). Additionally, each of the communication devices 808 and 814 may include a resource manager 120, 130 for determining assignments for transmitting one or more beacon signals that increase bandwidth occupancy. If the apparatus 804 is a relay access point, each communication device 820 may include at least one transmitter (represented by the transmitter 822) for transmitting signals (e.g., messages, indications, information, pilots, and so on) and at least one receiver (represented by the receiver 824) for receiving signals (e.g., messages, indications, information, and so on).

A transmitter and a receiver may comprise an integrated device (e.g., embodied as a transmitter circuit and a receiver circuit of a single communication device) in some implementations, may comprise a separate transmitter device and a separate receiver device in some implementations, or may be embodied in other ways in other implementations. In some aspects, a wireless communication device (e.g., one of multiple wireless communication devices) of the apparatus 804 comprises a network listen module.

The apparatus 806 (and the apparatus 804 if it is not a relay access point) includes at least one communication device (represented by the communication device 826 and, optionally, 820) for communicating with other nodes. For example, the communication device 826 may comprise a network interface that is configured to communicate with one or more network entities via a wire-based or wireless backhaul. In some aspects, the communication device 826 may be implemented as a transceiver configured to support wire-based or wireless signal communication. This communication may involve, for example, sending and receiving: messages, parameters, or other types of information. Accordingly, in the example of FIG. 8, the communication device 826 is shown as comprising a transmitter 828 and a receiver 830. Similarly, if the apparatus 804 is not a relay access point, the communication device 820 may comprise a network interface that is configured to communicate with one or more network entities via a wire-based or wireless backhaul. As with the communication device 826, the communication device 820 is shown as comprising a transmitter 822 and a receiver 824.

The apparatuses 802, 804, and 806 also include other components that may be used in conjunction with bandwidth occupancy for transmission in unlicensed spectrum as disclosed herein. The apparatus 802 includes a processing system 832 for providing functionality relating to, for example, communicating with an access point to support assignment of resources as taught herein and for providing other processing functionality. The apparatus 804 includes a processing system 834 for providing functionality relating to, for example, resource management as taught herein and for providing other processing functionality. The apparatus 806 includes a processing system 836 for providing functionality relating to, for example, resource management as taught herein and for providing other processing functionality. The apparatuses 802, 804, and 806 include memory devices 838, 840, and 842 (e.g., each including a memory device), respectively, for maintaining information (e.g., information indicative of reserved resources, thresholds, parameters, and so on). In addition, the apparatuses 802, 804, and 806 include user interface devices 844, 846, and 848, respectively, for providing indications (e.g., audible and/or visual indications) to a user and/or for receiving user input (e.g., upon user actuation of a sensing device such a keypad, a touch screen, a microphone, and so on).

For convenience, the apparatus 802 is shown in FIG. 8 as including components that may be used in the various examples described herein. In practice, the illustrated blocks may have different functionality in different aspects.

The components of FIG. 8 may be implemented in various ways. In some implementations, the components of FIG. 8 may be implemented in one or more circuits such as, for example, one or more processors and/or one or more ASICs (which may include one or more processors). Here, each circuit may use and/or incorporate at least one memory component for storing information or executable code used by the circuit to provide this functionality. For example, some or all of the functionality represented by blocks 808, 832, 838, and 844 may be implemented by processor and memory component(s) of the apparatus 802 (e.g., by execution of appropriate code and/or by appropriate configuration of processor components). In an aspect, the functionality represented by blocks 808, 832, 838, and 844 may be implemented by a processor 180, memory 186, transceiver 160, RF front end 140, and antenna 170 as described above with respect to FIG. 1B. Similarly, some or all of the functionality represented by blocks 814, 820, 834, 840, and 846 may be implemented by processor and memory component(s) of the apparatus 804 (e.g., by execution of appropriate code and/or by appropriate configuration of processor components). In an aspect, the functionality represented by blocks 814, 820, 834, and 846 may be implemented by a processor 180, memory 186, transceiver 160, RF front end 140, and antenna 170 in a similar manner as described above with respect to FIG. 1B in an access point instead of an access terminal. Also, some or all of the functionality represented by blocks 826, 836, 842, and 848 may be implemented by processor and memory component(s) of the apparatus 806 (e.g., by execution of appropriate code and/or by appropriate configuration of processor components). In an aspect, the functionality represented by blocks 826, 836, 842, and 848 may be implemented by a processor 180, memory 186, transceiver 160, RF front end 140, and antenna 170 in a similar manner as described above with respect to FIG. 1B in a network entity instead of an access terminal.

The use of interlaced beacon signals as described herein allows small size uplink control channel transmissions to maintain control of a channel. For example, a PUCCH transmission having a small payload does not require a larger coding gain. As another example, a PUSCH transmission having a small payload does not require reduction of modulation and coding scheme.

The use of channel usage beacon signals as described herein also allows demodulation at the eNodeB to have localized symbols instead of spreading across more RBs than necessary. Also, the beacon signals form a single frequency network (SFN) which are easier for the eNodeB to detect and cancel for determining the payload. Localization of the beacon signal in one interlace may be limited to interference with only one interlace of payload (e.g., a PUSCH transmission).

The use of channel usage beacon signals as described herein also allows uplink transmission to occur in discontinuous subframes.

The use of channel usage beacon signals as presented herein also allows uplink data transmission of multiple UEs on unlicensed RF bands to be distributed over time. For example, in a CCA environment typical in a WiFi network, instead of all UEs being limited to simultaneous uplink transmissions upon detecting a clear channel, the beacon signal allocated to each respective UE allows the network to behave more like an assigned channel scheme of an LTE network. For example, the eNodeB may allocate a beacon signal to follow a U-CUBS allocation, followed by a payload allocation (e.g., a PUSCH allocation).

While the methods and apparatus described herein relate to interlaced beacon signals in uplink transmissions to increase occupancy of the bandwidth, the same principles and techniques may be applied to a downlink transmission for instances when there may only be a few RBs to transmit in a subframe.

Some of the access points referred to herein may comprise low-power access points. In a typical network, low-power access points (e.g., femto cells) are deployed to supplement conventional network access points (e.g., macro access points). For example, a low-power access point installed in a user's home or in an enterprise environment (e.g., commercial buildings) may provide voice and high speed data service for access terminals supporting cellular radio communication (e.g., CDMA, WCDMA, UMTS, LTE, etc.). In general, these low-power access points provide more robust coverage and higher throughput for access terminals in the vicinity of the low-power access points.

As used herein, the term low-power access point refers to an access point having a transmit power (e.g., one or more of: maximum transmit power, instantaneous transmit power, nominal transmit power, average transmit power, or some other form of transmit power) that is less than a transmit power (e.g., as defined above) of any macro access point in the coverage area. In some implementations, each low-power access point has a transmit power (e.g., as defined above) that is less than a transmit power (e.g., as defined above) of the macro access point by a relative margin (e.g., 10 dBm or more). In some implementations, low-power access points such as femto cells may have a maximum transmit power of 20 dBm or less. In some implementations, low-power access points such as pico cells may have a maximum transmit power of 24 dBm or less. It should be appreciated, however, that these or other types of low-power access points may have a higher or lower maximum transmit power in other implementations (e.g., up to 1 Watt in some cases, up to 10 Watts in some cases, and so on).

Typically, low-power access points connect to the Internet via a broadband connection (e.g., a digital subscriber line (DSL) router, a cable modem, or some other type of modem) that provides a backhaul link to a mobile operator's network. Thus, a low-power access point deployed in a user's home or business provides mobile network access to one or more devices via the broadband connection.

Various types of low-power access points may be employed in a given system. For example, low-power access points may be implemented as or referred to as femto cells, femto access points, small cells, femto nodes, home NodeBs (HNBs), home eNodeBs (HeNBs), access point base stations, pico cells, pico nodes, or micro cells.

For convenience, low-power access points may be referred to simply as small cells in the discussion that follows. Thus, it should be appreciated that any discussion related to small cells herein may be equally applicable to low-power access points in general (e.g., to femto cells, to micro cells, to pico cells, etc.).

Small cells may be configured to support different types of access modes. For example, in an open access mode, a small cell may allow any access terminal to obtain any type of service via the small cell. In a restricted (or closed) access mode, a small cell may only allow authorized access terminals to obtain service via the small cell. For example, a small cell may only allow access terminals (e.g., so called home access terminals) belonging to a certain subscriber group (e.g., a closed subscriber group (CSG)) to obtain service via the small cell. In a hybrid access mode, alien access terminals (e.g., non-home access terminals, non-CSG access terminals) may be given limited access to the small cell. For example, a macro access terminal that does not belong to a small cell's CSG may be allowed to access the small cell only if sufficient resources are available for all home access terminals currently being served by the small cell.

Thus, small cells operating in one or more of these access modes may be used to provide indoor coverage and/or extended outdoor coverage. By allowing access to users through adoption of a desired access mode of operation, small cells may provide improved service within the coverage area and potentially extend the service coverage area for users of a macro network.

Thus, in some aspects the teachings herein may be employed in a network that includes macro scale coverage (e.g., a large area cellular network such as a third generation (3G) network, typically referred to as a macro cell network or a WAN) and smaller scale coverage (e.g., a residence-based or building-based network environment, typically referred to as a LAN). As an access terminal (AT) moves through such a network, the access terminal may be served in certain locations by access points that provide macro coverage while the access terminal may be served at other locations by access points that provide smaller scale coverage. In some aspects, the smaller coverage nodes may be used to provide incremental capacity growth, in-building coverage, and different services (e.g., for a more robust user experience).

In the description herein, a node (e.g., an access point) that provides coverage over a relatively large area may be referred to as a macro access point while a node that provides coverage over a relatively small area (e.g., a residence) may be referred to as a small cell. It should be appreciated that the teachings herein may be applicable to nodes associated with other types of coverage areas. For example, a pico access point may provide coverage (e.g., coverage within a commercial building) over an area that is smaller than a macro area and larger than a femto cell area. In various applications, other terminology may be used to reference a macro access point, a small cell, or other access point-type nodes. For example, a macro access point may be configured or referred to as an access node, base station, access point, eNodeB, macro cell, and so on. In some implementations, a node may be associated with (e.g., referred to as or divided into) one or more cells or sectors. A cell or sector associated with a macro access point, a femto access point, or a pico access point may be referred to as a macro cell, a femto cell, or a pico cell, respectively.

Figure 9:
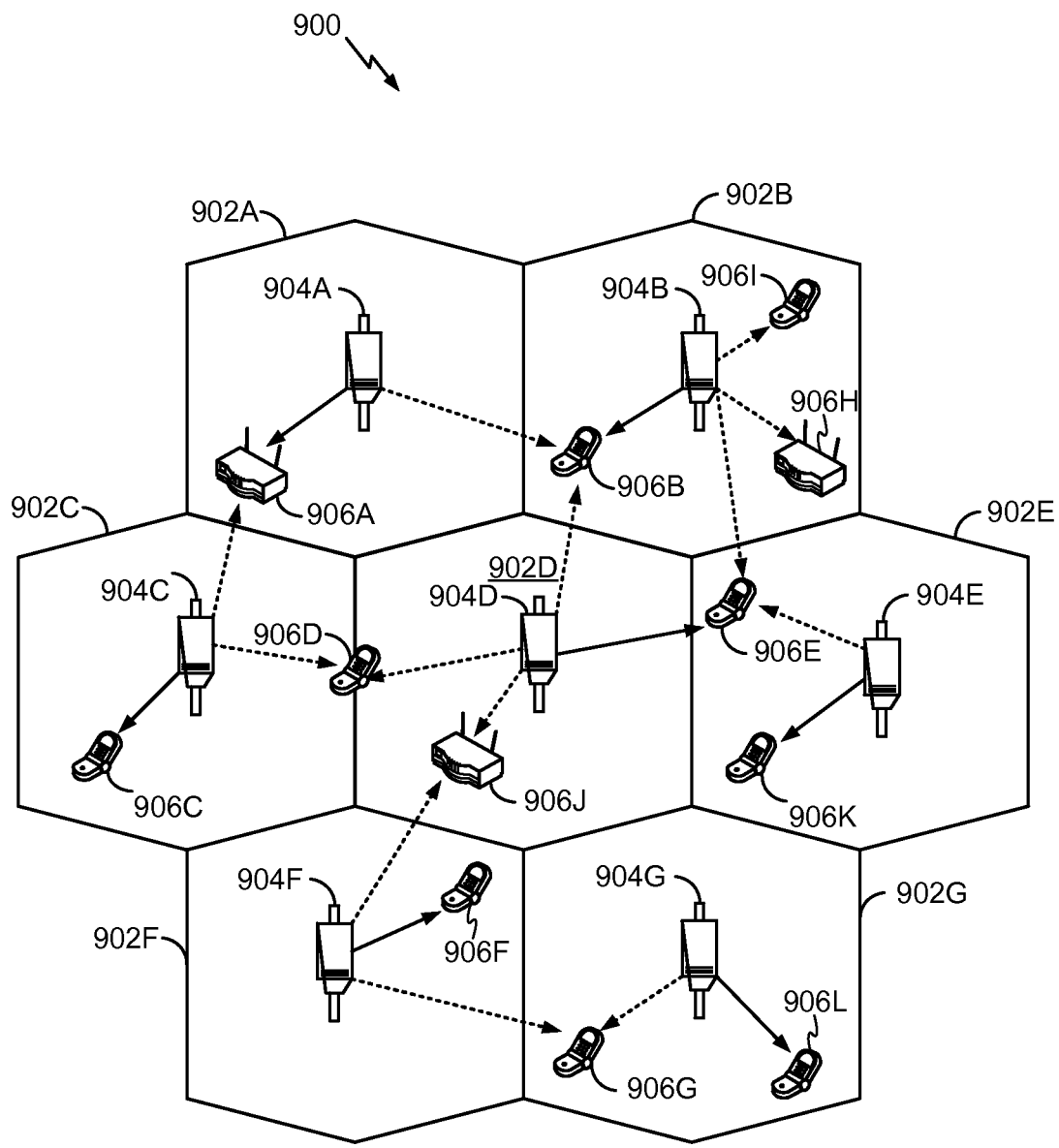
FIG. 9 is a simplified diagram of a wireless communication system.

FIG. 9 illustrates a wireless communication system 900, configured to support a number of users, in which the teachings herein may be implemented. For example, the access points 904 and the access terminals 906 may include a resource manager 120 and a resource manager 130 respectively (FIGS. 1A and 1B). The access terminals 906 and/or the access points 904 may implement the methods 200, 201, 300 illustrated in FIGS. 2A, 2B 3A, and 3B. The system 900 provides communication for multiple cells 902, such as, for example, macro cells 902A-902G, with each cell being serviced by a corresponding access point 904 (e.g., access points 904A-904G). As shown in FIG. 9, access terminals 906 (e.g., access terminals 906A-906L) may be dispersed at various locations throughout the system over time. Each access terminal 906 may communicate with one or more access points 904 on a forward link (FL) and/or a reverse link (RL) at a given moment, depending upon whether the access terminal 906 is active and whether it is in soft handoff, for example. The wireless communication system 900 may provide service over a large geographic region. For example, macro cells 902A-902G may cover a few blocks in a neighborhood or several miles in a rural environment.

Figure 10:
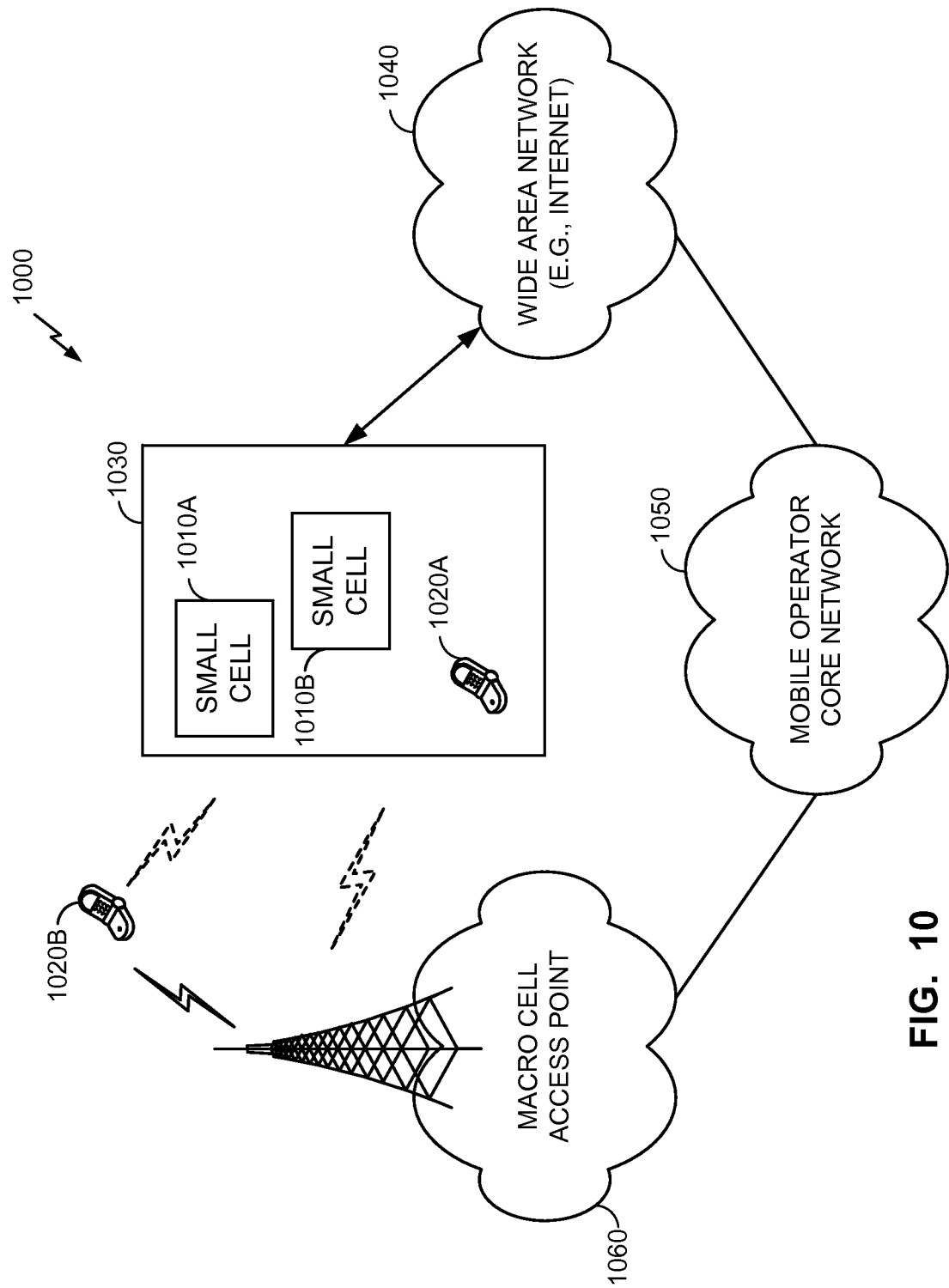
FIG. 10 is a simplified diagram of a wireless communication system including small cells.

FIG. 10 illustrates an example of a communication system 1000 where one or more small cells are deployed within a network environment. The communication system 1000 may include one or more network devices. For example, the small cells 1010 and access terminals 1020 may be network devices including a resource manager 120 for determining channels to use for transmissions. A small cell 1010 and/or an access terminal 1020 may implement the methods 200, 201, 300 illustrated in FIGS. 2A, 2B, 3A and 3B. Specifically, the system 1000 includes multiple small cells 1010 (e.g., small cells 1010A and 1010B) installed in a relatively small scale network environment (e.g., in one or more user residences 1030). Each small cell 1010 may be coupled to a wide area network 1040 (e.g., the Internet) and a mobile operator core network 1050 via a DSL router, a cable modem, a wireless link, or other connectivity means (not shown). As will be discussed below, each small cell 1010 may be configured to serve associated access terminals 1020 (e.g., access terminal 1020A) and, optionally, other (e.g., hybrid or alien) access terminals 1020 (e.g., access terminal 1020B). In other words, access to small cells 1010 may be restricted whereby a given access terminal 1020 may be served by a set of designated (e.g., home) small cell(s) 1010 but may not be served by any non-designated small cells 1010 (e.g., a neighbor's small cell 1010).

Referring again to FIG. 10, the owner of a small cell 1010 may subscribe to mobile service, such as, for example, 3G mobile service, offered through the mobile operator core network 1050. In addition, an access terminal 1020 may be capable of operating both in macro environments and in smaller scale (e.g., residential) network environments. In other words, depending on the current location of the access terminal 1020, the access terminal 1020 may be served by a macro cell access point 1060 associated with the mobile operator core network 1050 or by any one of a set of small cells 1010 (e.g., the small cells 1010A and 1010B that reside within a corresponding user residence 1030). For example, when a subscriber is outside his home, he is served by a standard macro access point (e.g., access point 1060) and when the subscriber is at home, he is served by a small cell (e.g., small cell 1010A). Here, a small cell 1010 may be backward compatible with legacy access terminals 1020.

A small cell 1010 may be deployed on a single frequency or, in the alternative, on multiple frequencies. Depending on the particular configuration, the single frequency or one or more of the multiple frequencies may overlap with one or more frequencies used by a macro access point (e.g., access point 1060). As discussed above, the small cell 1010 and/or an access terminal 1020 may include a resource manager 120 for selecting one or more frequencies to use for a transmission based, in part, on the usage by macro access point 1060.

In some aspects, an access terminal 1020 may be configured to connect to a preferred small cell (e.g., the home small cell of the access terminal 1020) whenever such connectivity is possible. For example, whenever the access terminal 1020A is within the user's residence 1030, it may be desired that the access terminal 1020A communicate only with the home small cell 1010A or 1010B.

In some aspects, if the access terminal 1020 operates within the macro cellular network 1050 but is not residing on its most preferred network (e.g., as defined in a preferred roaming list), the access terminal 1020 may continue to search for the most preferred network (e.g., the preferred small cell 1010) using a better system reselection (BSR) procedure, which may involve a periodic scanning of available systems to determine whether better systems are currently available and subsequently acquire such preferred systems. The access terminal 1020 may limit the search for specific band and channel. For example, one or more femto channels may be defined whereby all small cells (or all restricted small cells) in a region operate on the femto channel(s). The search for the most preferred system may be repeated periodically. Upon discovery of a preferred small cell 1010, the access terminal 1020 selects the small cell 1010 and registers on it for use when within its coverage area.

Access to a small cell may be restricted in some aspects. For example, a given small cell may only provide certain services to certain access terminals. In deployments with so-called restricted (or closed) access, a given access terminal may only be served by the macro cell mobile network and a defined set of small cells (e.g., the small cells 1010 that reside within the corresponding user residence 1030). In some implementations, an access point may be restricted to not provide, for at least one node (e.g., access terminal), at least one of: signaling, data access, registration, paging, or service.

In some aspects, a restricted small cell (which may also be referred to as a Closed Subscriber Group Home NodeB) is one that provides service to a restricted provisioned set of access terminals. This set may be temporarily or permanently extended as necessary. In some aspects, a Closed Subscriber Group (CSG) may be defined as the set of access points (e.g., small cells) that share a common access control list of access terminals.

Various relationships may thus exist between a given small cell and a given access terminal. For example, from the perspective of an access terminal, an open small cell may refer to a small cell with unrestricted access (e.g., the small cell allows access to any access terminal). A restricted small cell may refer to a small cell that is restricted in some manner (e.g., restricted for access and/or registration). A home small cell may refer to a small cell on which the access terminal is authorized to access and operate on (e.g., permanent access is provided for a defined set of one or more access terminals). A hybrid (or guest) small cell may refer to a small cell on which different access terminals are provided different levels of service (e.g., some access terminals may be allowed partial and/or temporary access while other access terminals may be allowed full access). An alien small cell may refer to a small cell on which the access terminal is not authorized to access or operate on, except for perhaps emergency situations (e.g., emergency-911 calls).

From a restricted small cell perspective, a home access terminal may refer to an access terminal that is authorized to access the restricted small cell installed in the residence of that access terminal's owner (usually the home access terminal has permanent access to that small cell). A guest access terminal may refer to an access terminal with temporary access to the restricted small cell (e.g., limited based on deadline, time of use, bytes, connection count, or some other criterion or criteria). An alien access terminal may refer to an access terminal that does not have permission to access the restricted small cell, except for perhaps emergency situations, for example, such as 911 calls (e.g., an access terminal that does not have the credentials or permission to register with the restricted small cell).

For convenience, the disclosure herein describes various functionality in the context of a small cell. It should be appreciated, however, that a pico access point may provide the same or similar functionality for a larger coverage area. For example, a pico access point may be restricted, a home pico access point may be defined for a given access terminal, and so on.

The teachings herein may be employed in a wireless multiple-access communication system that simultaneously supports communication for multiple wireless access terminals. Here, each terminal may communicate with one or more access points via transmissions on the forward and reverse links. The forward link (or downlink) refers to the communication link from the access points to the terminals, and the reverse link (or uplink) refers to the communication link from the terminals to the access points. This communication link may be established via a single-in-single-out system, a multiple-in-multiple-out (MIMO) system, or some other type of system.

A MIMO system employs multiple (NT) transmit antennas and multiple (NR) receive antennas for data transmission. A MIMO channel formed by the NT transmit and NR receive antennas may be decomposed into NS independent channels, which are also referred to as spatial channels, where NS≤min {NT, NR}. Each of the NS independent channels corresponds to a dimension. The MIMO system may provide improved performance (e.g., higher throughput and/or greater reliability) if the additional dimensionalities created by the multiple transmit and receive antennas are utilized.

A MIMO system may support time division duplex (TDD) and frequency division duplex (FDD). In a TDD system, the forward and reverse link transmissions are on the same frequency region so that the reciprocity principle allows the estimation of the forward link channel from the reverse link channel. This enables the access point to extract transmit beam-forming gain on the forward link when multiple antennas are available at the access point.

Figure 11:
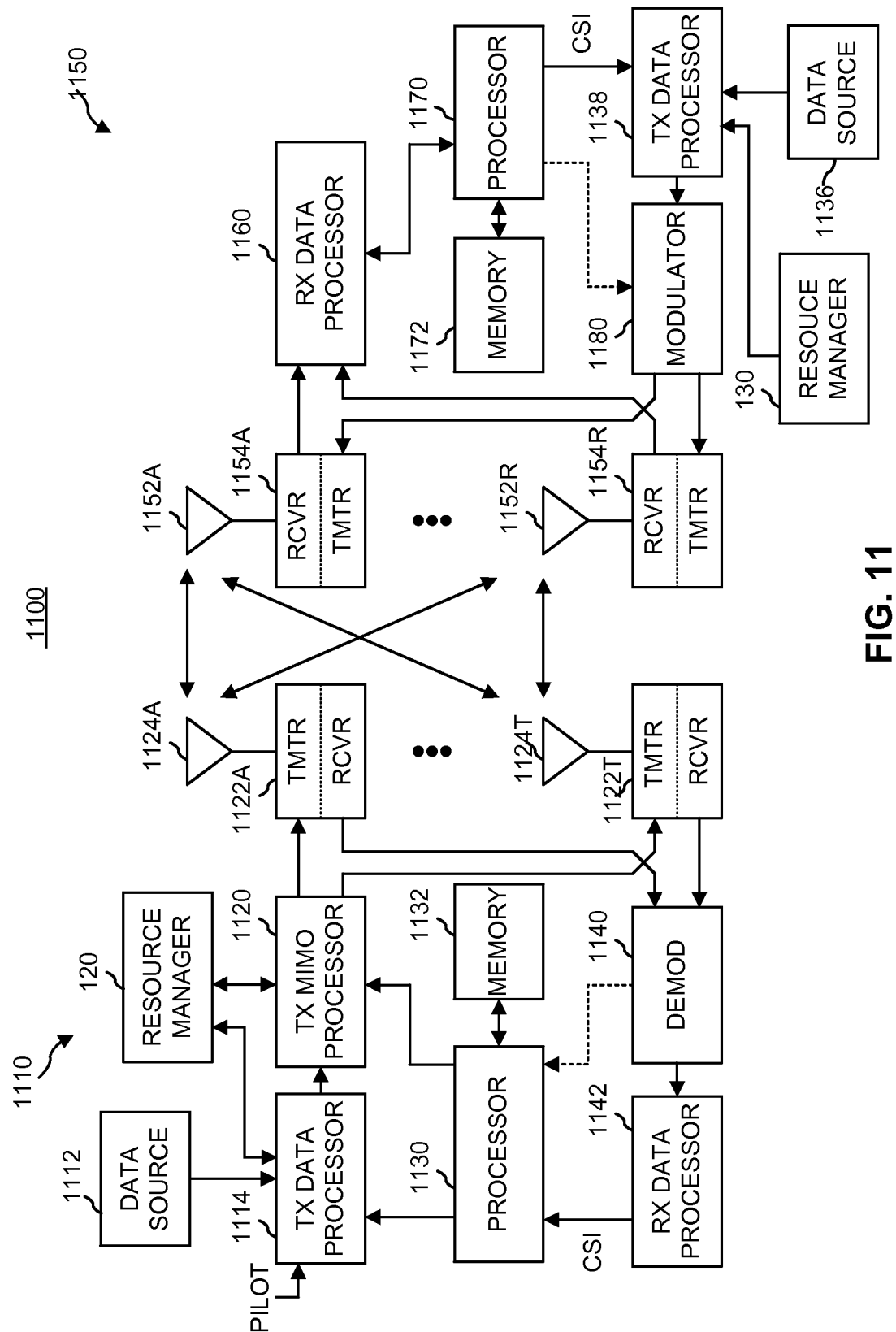
FIG. 11 is a simplified block diagram of several sample aspects of communication components.

FIG. 11 illustrates in more detail the components of a wireless device 1110 (e.g., a small cell AP) and a wireless device 1150 (e.g., a UE) of a sample communication system 1100 that may be adapted as described herein. For example, each of wireless device 1110 and wireless device 1150 may include a resource manager 120, 130 respectively, for determining assignment of interlaced resource blocks for transmissions. Either the wireless device 1110 or the wireless device 1150 may implement the methods illustrated in FIGS. 2A, 2B and 3. The resource manager 120 may be a separate component or may be implemented by components such as TX data processor 1114 and TX MIMO processor 1120 of wireless device 1110 or by TX data processor 1138 of device 1150. At the device 1110, traffic data for a number of data streams is provided from a data source 1112 to a transmit (TX) data processor 1114. Each data stream may then be transmitted over a respective transmit antenna.

The TX data processor 1114 formats, codes, and interleaves the traffic data for each data stream based on a particular coding scheme selected for that data stream to provide coded data. The coded data for each data stream may be multiplexed with pilot data using OFDM techniques. The pilot data is typically a known data pattern that is processed in a known manner and may be used at the receiver system to estimate the channel response. The multiplexed pilot and coded data for each data stream is then modulated (i.e., symbol mapped) based on a particular modulation scheme (e.g., BPSK, QSPK, M-PSK, or M-QAM) selected for that data stream to provide modulation symbols. The data rate, coding, and modulation for each data stream may be determined by instructions performed by a processor 1130. A data memory 1132 may store program code, data, and other information used by the processor 1130 or other components of the device 1110.

The modulation symbols for all data streams are then provided to a TX MIMO processor 1120, which may further process the modulation symbols (e.g., for OFDM). The TX MIMO processor 1120 then provides NT modulation symbol streams to NT transceivers (XCVR) 1122A through 1122T. In some aspects, the TX MIMO processor 1120 applies beam-forming weights to the symbols of the data streams and to the antenna from which the symbol is being transmitted.

Each transceiver 1122 receives and processes a respective symbol stream to provide one or more analog signals, and further conditions (e.g., amplifies, filters, and upconverts) the analog signals to provide a modulated signal suitable for transmission over the MIMO channel. NT modulated signals from transceivers 1122A through 1122T are then transmitted from NT antennas 1124A through 1124T, respectively.

At the device 1150, the transmitted modulated signals are received by NR antennas 1152A through 1152R and the received signal from each antenna 1152 is provided to a respective transceiver (XCVR) 1154A through 1154R. Each transceiver 1154 conditions (e.g., filters, amplifies, and downconverts) a respective received signal, digitizes the conditioned signal to provide samples, and further processes the samples to provide a corresponding "received" symbol stream.

A receive (RX) data processor 1160 then receives and processes the NR received symbol streams from NR transceivers 1154 based on a particular receiver processing technique to provide NT "detected" symbol streams. The RX data processor 1160 then demodulates, deinterleaves, and decodes each detected symbol stream to recover the traffic data for the data stream. The processing by the RX data processor 1160 is complementary to that performed by the TX MIMO processor 1120 and the TX data processor 1114 at the device 1110.

A processor 1170 periodically determines which pre-coding matrix to use (discussed below). The processor 1170 formulates a reverse link message comprising a matrix index portion and a rank value portion. A data memory 1172 may store program code, data, and other information used by the processor 1170 or other components of the device 1150.

The reverse link message may comprise various types of information regarding the communication link and/or the received data stream. The reverse link message is then processed by a TX data processor 1138, which also receives traffic data for a number of data streams from a data source 1136, modulated by a modulator 1180, conditioned by the transceivers 1154A through 1154R, and transmitted back to the device 1110. The resource manager 120 may determine the channels used by TX data processor 1138.

At the device 1110, the modulated signals from the device 1150 are received by the antennas 1124, conditioned by the transceivers 1122, demodulated by a demodulator (DEMOD) 1140, and processed by a RX data processor 1142 to extract the reverse link message transmitted by the device 1150. The processor 1130 then determines which pre-coding matrix to use for determining the beam-forming weights then processes the extracted message.

It will be appreciated that for each device 1110 and 1150 the functionality of two or more of the described components may be provided by a single component. It will also be appreciated that the various communication components illustrated in FIG. 11 and described above may be further configured as appropriate to perform bandwidth occupancy for transmission in unlicensed spectrum as taught herein. For example, the processors 1130/1170 may cooperate with the memories 1132/1172 and/or other components of the respective devices 1110/1150 to perform the interlaced resource allocation as taught herein.

In some aspects, an apparatus or any component of an apparatus may be configured to (or operable to or adapted to) provide functionality as taught herein. This may be achieved, for example: by manufacturing (e.g., fabricating) the apparatus or component so that it will provide the functionality; by programming the apparatus or component so that it will provide the functionality; or through the use of some other suitable implementation technique. As one example, an integrated circuit may be fabricated to provide the requisite functionality. As another example, an integrated circuit may be fabricated to support the requisite functionality and then configured (e.g., via programming) to provide the requisite functionality. As yet another example, a processor circuit may execute code to provide the requisite functionality.

It should be understood that any reference to an element herein using a designation such as "first," "second," and so forth does not generally limit the quantity or order of those elements. Rather, these designations may be used herein as a convenient method of distinguishing between two or more elements or instances of an element. Thus, a reference to first and second elements does not mean that only two elements may be employed there or that the first element must precede the second element in some manner. Also, unless stated otherwise a set of elements may comprise one or more elements. In addition, terminology of the form "at least one of A, B, or C" or "one or more of A, B, or C" or "at least one of the group consisting of A, B, and C" used in the description or the claims means "A or B or C or any combination of these elements." For example, this terminology may include A, or B, or C, or A and B, or A and C, or A and B and C, or 2A, or 2B, or 2C, and so on.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The methods, sequences and/or algorithms described in connection with the aspects disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor.

Accordingly, an aspect of the disclosure can include a computer readable medium embodying a method for dynamic bandwidth management for transmissions in unlicensed spectrum. Accordingly, the disclosure is not limited to the illustrated examples.

While the foregoing disclosure shows illustrative aspects, it should be noted that various changes and modifications could be made herein without departing from the scope of the disclosure as defined by the appended claims. The functions, steps and/or actions of the method claims in accordance with the aspects of the disclosure described herein need not be performed in any particular order. Furthermore, although certain aspects may be described or claimed in the singular, the plural is contemplated unless limitation to the singular is explicitly stated.

What is claimed is:

1. A method for uplink transmission by a user equipment (UE), comprising:
   receiving a first assignment for one or more beacon signals, the first assignment including a first interlace assignment in a contention-based spectrum;
   determining that a size of an uplink grant for a payload of an uplink transmission is less than a threshold, wherein the uplink grant includes a resource assignment and a second interlace assignment in the contention-base spectrum; and
   transmitting the one or more beacon signals according to the first assignment in response to determining that the size of the uplink grant for the payload of the uplink transmission is less than the threshold, wherein the one or more beacon signals increase bandwidth occupancy by the UE over the contention-based spectrum,
   wherein the one or more beacon signals transmitted according to the first assignment provides a bandwidth occupancy percentage that meets or exceeds a bandwidth occupancy level.

2. The method of claim 1, further comprising:
   receiving the uplink grant for the payload of the uplink transmission; and
   transmitting the payload of the uplink transmission according to the resource assignment on the second interlace assignment.

3. The method of claim 2, wherein the first interlace assignment and the second interlace assignment assign a common interlace, and wherein transmitting the one or more beacon signals includes transmitting the one or more beacon signals on resources of the common interlace that are different from the resource assignment used to transmit the payload in the uplink transmission.

4. The method of claim 2, wherein the first interlace assignment is different from the second interlace assignment.

5. The method of claim 2, wherein transmitting the payload includes transmitting at least one PUSCH payload on the second interlace assignment and at least one PUCCH payload according to the first interlace assignment, and wherein transmitting the one or more beacon signals includes transmitting the one or more beacon signals on resource blocks associated with the first interlace assignment that are unoccupied by the at least one PUCCH payload.

6. The method of claim 2, wherein the second assignment is for a first subframe, the method further comprising:
   receiving a second grant for another payload of a second uplink transmission on a second subframe; and
   transmitting the one or more beacon signals in an empty subframe between the first subframe and the second subframe.

7. The method of claim 2, wherein the resource assignment includes an assignment of resource blocks or an assignment of orthogonal frequency division multiplexing (OFDM) symbols within a subframe.

8. The method of claim 7, wherein:
   the resource assignment assigns resources after a first resource block or a first OFDM symbol within the subframe; and
   transmitting the one or more beacon signals includes transmitting the one or more beacon signals in the first resource block or the first OFDM symbol and in any subsequent resource block or OFDM symbol before the assigned resources.

9. The method of claim 1, wherein determining that the size of the uplink grant for the payload of the uplink transmission is less than the threshold includes determining that the payload of the uplink transmission includes a physical uplink control channel (PUCCH) payload, a physical uplink shared channel (PUSCH) payload, or both and determining that a total payload is less than the threshold.

10. The method of claim 9, wherein determining that the size of the uplink grant for the payload of the uplink transmission is less than the threshold includes determining that the payload is an empty payload associated with an empty subframe.

11. The method of claim 1, wherein the first interlace assignment is shared with uplink transmissions of at least one additional UE to form a single frequency network (SFN).

12. The method of claim 1, further comprising:
   controlling a transmit power used to transmit each of the one or more beacon signals separately from a transmit power used to transmit the payload.

13. The method of claim 1, wherein each of the one or more beacon signals includes a signal waveform that is known to an access point that receives and processes the one or more beacon signals.

14. A user equipment (UE) for uplink transmission, comprising:

means for receiving a first assignment for one or more beacon signals, the first assignment including a first interlace assignment in a contention-based spectrum;

means for determining that a size of an uplink grant for a payload of an uplink transmission is less than a threshold, wherein the uplink grant includes a resource assignment and a second interlace assignment in the contention-base spectrum; and means for transmitting the one or more beacon signals according to the first assignment in response to determining that the size of the uplink grant for the payload of the uplink transmission is less than the threshold, wherein the one or more beacon signals increase bandwidth occupancy by the UE over the contention-based spectrum, wherein the one or more beacon signals transmitted according to the first assignment provides a bandwidth occupancy percentage that meets or exceeds a bandwidth occupancy level.

15. The UE of claim 14,
wherein the means for receiving is further for receiving the uplink grant for the payload of the uplink transmission; and
wherein the means for transmitting is further for transmitting the payload of the uplink transmission according to the resource assignment on the second interlace assignment.

16. The UE of claim 15, wherein the processor and the memory are configured to determine that the size of the uplink grant for the payload of the uplink transmission is less than the threshold by determining that the payload of the uplink transmission includes a physical uplink control channel (PUCCH) payload, a physical uplink shared channel (PUSCH) payload, or both and determining that a total payload is less than the threshold.

17. The UE of claim 15, wherein the processor and the memory are configured to determine that the size of the uplink grant for the payload of the uplink transmission is less than the threshold by determining that the payload is an empty payload associated with an empty subframe.

18. The UE of claim 15, wherein the first interlace assignment is shared with uplink transmissions of at least one additional UE to form a single frequency network (SFN).

19. The UE of claim 15, wherein the processor and the memory are further configured to:
control a transmit power used to transmit each of the one or more beacon signals separately from a transmit power used to transmit the payload.

20. The UE of claim 15, wherein each of the one or more beacon signals includes a signal waveform that is known to an access point that receives and processes the one or more beacon signals.

21. A user equipment (UE) for uplink transmission, comprising:
a transceiver configured to receive signals indicating at least one assignment and to transmit one or more beacon signals;
a memory; and
a processor communicatively coupled to the transceiver and the memory, wherein the processor and the memory are configured to:
receive, via the transceiver, a first assignment for the one or more beacon signals, the first assignment including a first interlace assignment in a contention-based spectrum;
determine that a size of an uplink grant for a payload of an uplink transmission is less than a threshold, wherein the uplink grant includes a resource assignment and a second interlace assignment in the contention-base spectrum; and
transmit, via the transceiver, the one or more beacon signals according to the first assignment in response to determining that the size of the uplink grant for the payload of the uplink transmission is less than the threshold, wherein the one or more beacon signals increase bandwidth occupancy by the UE over the contention-based spectrum,
wherein the one or more beacon signals transmitted according to the first assignment provides a bandwidth occupancy percentage that meets or exceeds a bandwidth occupancy level.

22. The UE of claim 21, wherein the processor and the memory are further configured to:
receive the uplink grant for the payload of the uplink transmission; and
transmit the payload of the uplink transmission according to the resource assignment on the second interlace assignment.

23. The UE of claim 22, wherein the first interlace assignment and the second interlace assignment assign a common interlace, and the processor and the memory are configured to transmit the one or more beacon signals on a resources of the common interlace that are different from the resource assignment used to transmit the payload in the uplink transmission.

24. The UE of claim 21, wherein the processor and the memory are configured to transmit at least one PUSCH payload on the second interlace assignment and at least one PUCCH payload according to the first interlace assignment, and wherein the one or more beacon signals occupy resource blocks associated with the first interlace assignment that are unoccupied by the at least one PUCCH payload.

25. The UE of claim 21, wherein the second assignment is for a first subframe, wherein the processor and the memory are further configured to:
receive a third assignment for another payload on a second uplink transmission on a second subframe; and
transmit, via the transceiver, the one or more beacon signals in an empty subframe between the first subframe and the second subframe.

26. The UE of claim 21, wherein the resource assignment includes an assignment of resource blocks or an assignment of orthogonal frequency division multiplexing (OFDM) symbols.

27. A computer readable medium storing computer executable code for uplink transmission by a user equipment (UE), comprising:
code for receiving a first assignment for one or more beacon signals, the first assignment including a first interlace assignment in a contention-based spectrum;
code for determining that a size of an uplink grant for a payload of an uplink transmission is less than a threshold, wherein the uplink grant includes a resource assignment and a second interlace assignment in the contention-base spectrum; and
code for transmitting the one or more beacon signals according to the first assignment in response to determining that the size of the payload of the uplink transmission is less than the threshold, wherein the one or more beacon signals increase bandwidth occupancy by the UE over the contention-based spectrum, wherein the one or more beacon signals transmitted according to the first assignment provides a bandwidth occupancy percentage that meets or exceeds a bandwidth occupancy level.

28. The computer readable medium of claim 27, further comprising:
   code for receiving the uplink grant for the payload of the uplink transmission; and
   code for transmitting the payload of the uplink transmission according to the resource assignment on the second interlace assignment.

\* \* \* \* \*